US012771734B2

(12) United States Patent
Lam et al.

(10) Patent No.: US 12,771,734 B2
(45) Date of Patent: Oct. 20, 2026

(54) MEETING VISUALIZER

(71) Applicant: Microsoft Technology Licensing, LLC, Redmond, WA (US)

(72) Inventors: Candice Allison Lam, Vancouver (CA); Adam Michael Gleisner, Seattle, WA (US); Francois Rouaix, Issaquah, WA (US); Sarah Ragab Ismail Saleh, Vancouver (CA); Erez Kikin-Gil, Bellevue, WA (US); Ian William Mikutel, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 452 days.

(21) Appl. No.: 18/471,210

(22) Filed: Sep. 20, 2023

(65) Prior Publication Data

US 2025/0097272 A1 Mar. 20, 2025

(51) Int. Cl.
*H04L 65/1059* (2022.01)
*G06F 3/16* (2006.01)
(Continued)

(52) U.S. Cl.
CPC .......... *H04L 65/1059* (2013.01); *G06F 3/167* (2013.01); *G06F 40/30* (2020.01); (Continued)

(58) Field of Classification Search
CPC .......................... G06Q 10/101; G06F 3/04842
See application file for complete search history.

(56) References Cited

U.S. PATENT DOCUMENTS 8,065,173 B2 * 11/2011 Abu-Hakima .......... H04L 67/56 702/182
9,143,728 B2 * 9/2015 Hartung .................. H04N 7/15
(Continued)

OTHER PUBLICATIONS

"Learning Through Visuals", Retrieved from: https://www.psychologytoday.com/us/blog/get-psyched/201207/learning-through-visuals, Jul. 20, 2012, 12 Pages.
(Continued)

*Primary Examiner* — Benjamin Smith
(74) *Attorney, Agent, or Firm* — NovoTechIP International PLLC

(57) ABSTRACT

A data processing system implements techniques for automatically generating visualizations of content for meetings on an online communications platform. The visualizations are interactive and encourage participant engagement. The system automatically generates the visualizations based on a transcript of the meeting and other information associated with the meeting as the meeting is taking place. The system determines a meeting category based on this information and suggests a visualization layout based on the meeting category. The system then automatically generates the visualization using a generative language model. The generative language model generates interactive visualization based on the suggested visualization layout and transcript of the meeting and other information associated with the meeting as the meeting. The interactive visualization is then presented to the participants of the online communication session via the online communications platform to enable the participants to collaborate on the interactive visualization.

20 Claims, 14 Drawing Sheets

(51) Int. Cl.
*G06F 40/30* (2020.01)
*G06F 40/35* (2020.01)
*G10L 15/00* (2013.01)
*H04L 51/02* (2022.01)
*H04L 65/403* (2022.01)

(52) U.S. Cl.
CPC .............. *G06F 40/35* (2020.01); *G10L 15/00* (2013.01); *G06F 2203/04803* (2013.01); *H04L 51/02* (2013.01); *H04L 65/403* (2013.01)

(56) References Cited

U.S. PATENT DOCUMENTS 9,245,254 B2 * 1/2016 Lord ...................... G06Q 10/10
9,307,001 B2 * 4/2016 Chougle ............. H04L 65/1083
10,409,550 B2 * 9/2019 Malatesha ............... G06F 3/041
10,572,858 B2 * 2/2020 Nelson .................... G06F 40/35
10,607,611 B1 * 3/2020 Shellef .................... G10L 15/01
10,757,148 B2 * 8/2020 Nelson ................ H04L 65/4015
10,911,718 B2 * 2/2021 Nassar .................. H04M 3/567
10,996,839 B2 * 5/2021 Faulkner ................... G06F 3/14
11,030,585 B2 * 6/2021 Nelson ................... G06N 20/00
11,307,735 B2 * 4/2022 Nelson ................ G06F 3/04817
11,394,923 B2 * 7/2022 Morabia ............. H04L 65/1093
11,483,273 B2 * 10/2022 Mahmoud ............... G06F 40/30
11,501,255 B2 * 11/2022 Mann ................. G05B 13/0265
11,615,799 B2 * 3/2023 Zhu ....................... G06F 16/383
704/235
11,720,244 B2 * 8/2023 Rongrong ............. H04L 67/306
715/753
11,722,536 B2 * 8/2023 Crumley ............. G06F 3/04842
709/231
11,741,298 B1 * 8/2023 Polavaram ............ G06F 40/166
715/727
11,765,113 B2 * 9/2023 Bergenlid ................ H04N 7/15
709/205
11,847,724 B2 * 12/2023 Beaver ................. G06Q 30/016
11,949,526 B1 * 4/2024 Teng ..................... G06F 3/0481
12,068,872 B2 * 8/2024 Lee ..................... H04L 12/1818
12,136,172 B2 * 11/2024 Akmal .................... G06F 3/167
12,141,903 B1 * 11/2024 Reynolds ................ H04L 67/02
12,182,502 B1 * 12/2024 Nakajima ............. G06F 40/169
12,225,324 B2 * 2/2025 Lee ........................ H04N 21/81
12,231,478 B2 * 2/2025 Phillips ................... G10L 15/22
2009/0112608 A1 * 4/2009 Abu-Hakima ..... G06Q 30/0242
705/345
2011/0087973 A1 * 4/2011 Martin ................... G06Q 10/06
709/204
2013/0144603 A1 * 6/2013 Lord ..................... H04L 67/306
704/235
2014/0218464 A1 * 8/2014 Hartung ................ G06F 3/0481
348/14.07
2015/0334313 A1 * 11/2015 Chougle ............. H04L 65/1083
348/14.07
2016/0070580 A1 * 3/2016 Johnson ............. G06Q 30/0283
715/708
2018/0039951 A1 * 2/2018 Wynn ................ H04N 21/4312
2018/0101281 A1 * 4/2018 Nelson ................... G06N 5/022
2018/0101823 A1 * 4/2018 Nelson ................... H04N 7/155
2018/0316637 A1 * 11/2018 Desjardins .......... H04L 65/4025
2019/0108492 A1 * 4/2019 Nelson .................... G10L 15/26
2019/0273767 A1 * 9/2019 Nelson ................ H04M 7/0027
2020/0145616 A1 * 5/2020 Nassar ................ G06F 9/45533
2020/0371677 A1 * 11/2020 Faulkner ................... G06F 3/14
2021/0021558 A1 * 1/2021 Mahmoud ............. H04L 51/046
2021/0074272 A1 * 3/2021 Shellef .................... G06F 40/30
2021/0342785 A1 * 11/2021 Mann ................. G05B 13/0265
2021/0375289 A1 * 12/2021 Zhu ....................... G06F 40/253
2022/0028138 A1 * 1/2022 Beaver .................... G06F 40/49
2022/0342524 A1 * 10/2022 Rongrong ............. G06F 3/0486
2022/0353096 A1 * 11/2022 Smith ................. H04L 12/1818
2023/0087244 A1 * 3/2023 Akmal .................... G06T 15/20
345/633
2023/0119561 A1 * 4/2023 Bergenlid ............... G10L 15/22
709/205
2023/0164294 A1 * 5/2023 Lee .................... H04N 21/4316
348/14.01
2023/0208895 A1 * 6/2023 Crumley ............. G06F 3/04842
709/231
2023/0368444 A1 * 11/2023 Blackburne ........... G06T 11/001
2024/0037324 A1 * 2/2024 Polavaram ............ G06F 40/166
2024/0195851 A1 * 6/2024 Phillips ................... G10L 15/22
2024/0205174 A1 * 6/2024 Bailey ..................... G06F 40/30
2024/0243938 A1 * 7/2024 Teng ................... H04L 12/1818
2024/0311576 A1 * 9/2024 Mikutel ................ G06F 3/0484
2024/0354493 A1 * 10/2024 Nakajima ............... G10L 17/18
2024/0380800 A1 * 11/2024 Bryan ................... G06F 3/0484
2024/0411906 A1 * 12/2024 White .................... G06N 20/00
2025/0028579 A1 * 1/2025 Mehmeri ................ H04L 51/02
2025/0094188 A1 * 3/2025 Vigeant ................... G06F 9/453
2025/0181215 A1 * 6/2025 Saleh .................... G06F 3/0484
2025/0239021 A1 * 7/2025 Curry ...................... G06F 40/40
2025/0373458 A1 * 12/2025 Saleh .................. H04L 12/1822

OTHER PUBLICATIONS

"Will AI Fix Work?", Retrieved from: https://www.microsoft.com/en-us/worklab/work-trend-index/will-ai-fix-work, May 9, 2023, 20 Pages.

* cited by examiner

MEETING VISUALIZER

BACKGROUND

Online communications platforms have become an increasingly important tool to facilitate collaboration among meeting participants. The communication platforms provide audio and video content of the participants but can also provide the ability for users to share content with other users. This content can include non-interactive content that is presented by a participant via screen sharing or interactive content that enables the participants to interactive with and/or collaborate on the creation of the interactive content. In particular, the inclusion of interactive content in an online meeting can increase participant engagement, retention of information and shared understanding. However, many meeting participants are often unaware of the ability to add such interactive content to an online meeting, unaware how to add such interactive content to the online meeting, or are aware that interactive content exists, but find it onerous to set up. Hence, there is a need for improved systems and methods that provide means for automatically assisting meeting participants in the creation of interactive content during an online meeting.

SUMMARY

An example data processing system according to the disclosure includes a processor and a memory storing executable instructions. The instructions when executed cause the processor alone or in combination with other processors to perform operations including detecting an occurrence of a trigger condition during an online communication session among a plurality of client devices associated with participants of the online communication session, the occurrence of the trigger condition indicating that a visualization of content associated with the online communication session should be generated and presented on the client devices associated with the participants of the online communication session; selecting a candidate visualization layout from a plurality of visualization layouts in a visualization layout datastore based on the meeting category associated with the online communication session; constructing a prompt for a language model based on the selected candidate visualization layout and a transcript of the online communication session; providing the prompt as an input to a language model; obtaining visualization information as an output from the language model, wherein the visualization information is formatted according to the selected candidate layout and includes information based on the transcript, the additional information associated with the online communication session, or both; causing the plurality of client devices associated with the participants of the online communication session to present the visualization information in an interactive workspace on a user interface of the plurality of client devices; and synchronizing the changes to the visualization information among the plurality of client devices during the online communication session.

An example method implemented in a data processing system includes detecting an occurrence of a trigger condition during an online communication session among a plurality of client devices associated with participants of the online communication session, the occurrence of the trigger condition indicating that a visualization of content associated with the online communication session should be generated and presented on the client devices associated with the participants of the online communication session; analyzing information associated with the online communication session to determine a meeting category associated with the online communication session, wherein analyzing the information associated with the online communication session includes generating a transcript of an audio portion of the online communication session using a transcription model, and analyzing the transcript and additional information associated with the online communication session as an input to a categorization model that outputs the meeting category associated with the online communication session; selecting a set of candidate visualization layouts from a plurality of visualization layouts in a visualization layout datastore based on the meeting category associated with the online communication session; causing a client device of a participant to the online communication session to present the set of candidate visualization layouts on a user interface of the client device; receiving an indication from the client device indicating a selected candidate layout from among the plurality of candidate visualization layouts; providing the selected candidate layout, the transcript, and the additional information associated with the online communication session as an input to a language model; obtaining visualization information as an output from the language model, wherein the visualization information is formatted according to the selected candidate layout and includes information based on the transcript, the additional information associated with the online communication session, or both; causing the plurality of client devices associated with the participants of the online communication session to present the visualization information in an interactive workspace on a user interface of the plurality of client devices, wherein the user interface provides controls that enable users of the plurality of client devices to make changes to the visualization information; and synchronizing the changes to the visualization information among the plurality of client devices during the online communication session.

An example data processing system according to the disclosure includes a processor and a memory storing executable instructions. The instructions when executed cause the processor alone or in combination with other processors to perform operations including establishing an online communication session with a first application on a plurality of client devices of participants to the online communication session; receiving an indication to generate a visualization of content of the online communication session; constructing a prompt for a language model based on a transcript of the online communication session; providing the prompt as an input to a language model; obtaining visualization information as an output from the language model, wherein the visualization information is formatted according to a layout generated by the language model and includes information based on the transcript; causing the plurality of client devices associated with the participants of the online communication session to present the visualization information in an interactive workspace on a user interface of the plurality of client devices, wherein the user interface provides controls that enable users of the plurality of client devices to make changes to the visualization information; and synchronizing the changes to the visualization information among the plurality of client devices during the online communication session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
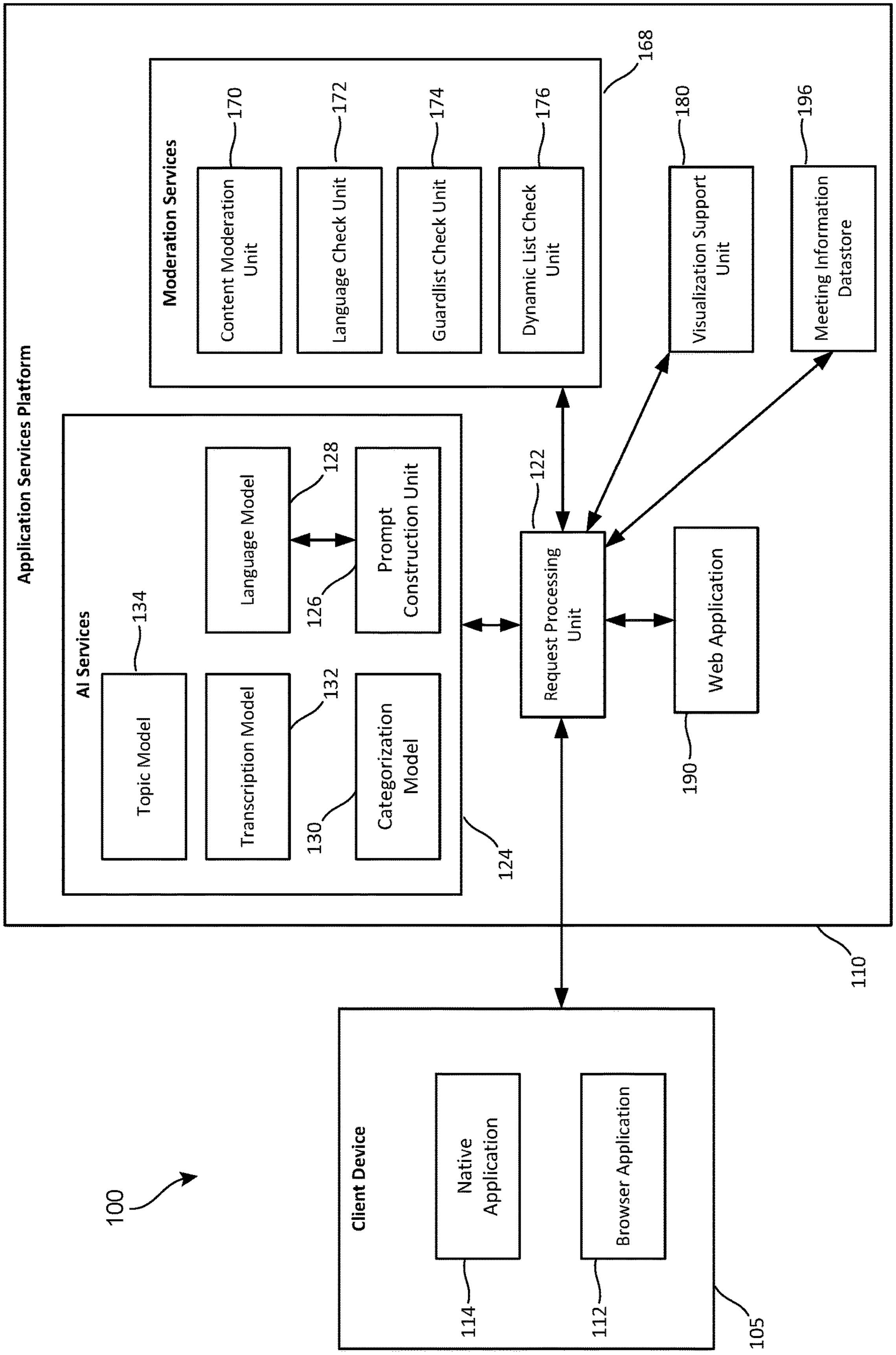
FIG. 1A is a diagram of an example computing environment in which the techniques for automatically generating visualizations of meeting content described herein are implemented.

Systems and methods for automatically generating visualizations for online communication sessions are described herein. These techniques provide a technical solution to the technical problem of how to increase participant engagement retention of information and shared understanding in online meetings conducted on an online communications platform. Many online communications platforms allow participants to an online meeting to present static or interactive content during the meeting. The inclusion of interactive content in particular can increase participant engagement. However, many meeting participants are often unaware of the ability to add such interactive content to an online meeting, unaware how to add such interactive content to the online meeting, or are aware that interactive content exists, but find it onerous to set up. The techniques herein provide a technical solution to these problems by automatically generating an interactive visualization of content associated with an online communication session and presenting the visualization to participants during the online communication session. The participants can collaborate with the other meeting participants to add to the interactive visualizations of the content. The interactive visualization is implemented as an interactive virtual whiteboard on which the participants can type, draw, write, or otherwise interact with the virtual whiteboard using a keyboard, mouse, stylus pen, touchscreen, voice, and/or other input. Initially, contents of the virtual whiteboard are automatically created by analyzing a transcript of the online communication session, chat messages associated with the online communication session, and/or other data associated with the online communication session to determine a meeting category for the online communication session and to select visualization layout templates based on the meeting category. The visualization layout templates are presented to a participant to the online communication session to select a preferred layout from among the visualization layout templates, and the contents of the visualization are automatically generated by a generative language model from the meeting transcript, the chat messages, and/or other content associated with the online communication session using a generative language model. In other implementations, the generative language model does not rely on predetermined visualization layout templates and instead creates the layout for the visualization. The contents of the visualization can also be updated automatically based on the meeting transcript, the chat messages, and/or other content associated with the online communication session during the online communication session. A technical benefit of this approach is that participant engagement and information retention can be increased. Furthermore, the automatic creation and updating of the visualization content using the generative language model can help reduce the overall computing resources associated with creating the collaborative content by generating content that is predicted to be relevant to the participants of the online communication session based on transcription, chat messages, and other content associated with the online communication session. This approach provides the participants with a starting point for further collaboration that encourages discussion and collaboration rather than starting from a blank document in which the participants struggle to develop a visualization that meets their needs, thereby consuming additional computing resources. These and other technical benefits of the techniques disclosed herein will be evident from the discussion of the example implementations that follow.

FIG. 1A is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to communications platforms, visualization and collaboration tools for collaboratively creating visual representations of information, and other applications for consuming and/or creating electronic content. In the implementation show in FIG. 1A, the functionality of the communications platform and the visualization and collaboration tools are integrated into a single set of applications. In contrast, in the example implementation of the computing environment 100 shown in FIG. 1B, the communications platform and the visualization and collaboration tools are implemented in separate applications that can be utilized together to provide a seamless user experience similar to that provided in the implementation shown in FIG. 1A. The client device 105 and the application services platform 110 communicate with each other over a network (not shown). The network may be a combination of one or more public and/or private networks and may be implemented at least in part by the Internet.

The application services platform 110 includes a request processing unit 122, artificial intelligence (AI) services 124, visualization support unit 180, moderation services 168, a web application 190, and meeting information datastore 196. The request processing unit 122 is configured to receive requests from the native application 114 of the client device 105 and/or the web application 190 of the application services platform 110. The requests may include but are not limited to requests to establish an online communication session and/or requests to create, view, and/or modify various types of electronic content, including creating visualizations of content of an online communication session as discussed in the examples which follow. In the example implementation shown in FIG. 1A, the communication platform functionality and the visualization and collaboration tool functionality are combined into a single set of applications. In some implementations, the web application 190 of the application services platform 110 implements this functionality. In other implementations, at least a portion of this functionality is implemented by the native application 114 of the client device 105. The request processing unit 122 also coordinates communication and exchange of data among components of the application services platform 110 as discussed in the examples which follow.

The meeting information datastore 196 is a persistent datastore in the memory of the application services platform 110 that stores information associated with an online communication session. The meeting information datastore 196 stores meeting invite information, participant information, recordings of meeting audio and/or video, transcripts of the meeting, contents of the meeting chat, file attachment information for files shared by participants of the online communication session, visualization information for visualizations created during the online communication session, and/or other information associated with an online communication session. The visualization information can be used to populate a virtual whiteboard as discussed in the examples which follow. The meeting information datastore 196 is accessible to the native application 114, the web application 190, and/or the communications platform web application 192 to permit the participants to access the content associated with online communication session both during and after the online communication session.

The AI services 124 include transcription model 132, a meeting categorization model 130, a prompt construction unit 126, a language model 128, and a topic model 134. The transcription model 132 is trained to receive audio content from an online communication session, to identify the speech included therein, and to output a written transcript of this speech. Some implementations of the transcription model 132 can identify which participant to the online communication session is speaking and add an identifier for that participant with the speech in the transcript so that someone reading the transcript can identify who said what. The meeting categorization model 130 is a classification model that is trained to predict a meeting category from a set of meeting categories supported by the application services platform 110 for creating visualizations of the meeting content. The meeting categorization model 130 receives various types of textual input, such as but not limited to all or a portion of the meeting transcript, all or portion of the meeting chat, a number of meeting, attendee information (such as the job title, role, or other information), and/or information obtained from the calendar invite associated with the meeting. The information from the calendar invite may include but is not limited to a meeting title, a meeting description, and attached information and/or textual content extracted from the attachments to the calendar invite. The meeting categorization model 130 is trained to predict a meeting category from among the supported meeting categories based on the information available to the model. The prediction output by the meeting categorization model 130 is associated with a confidence score in some implementations, and the AI services 124 are configured to output an indication that the meeting category could not be determined if the confidence score is below a predetermined confidence score threshold. In such instances, the application services platform 110 suggests a default set of visualization layouts to the user based on the most frequently selected visualization layouts.

The language model 128 is a machine learning model trained to generate textual content in response to natural language prompts input by a user via the native application 114 or via the browser application 112. The language model 128 is implemented using a large language model (LLM) in some implementations. Examples of such models include but are not limited to a Generative Pre-trained Transformer 3 (GPT-3), or GPT-4 model. Other implementations may utilize other models or other generative models to generate textual content in response to user prompts. The language model 128 is used to generate content to be included in visualizations to be presented to users in an online communication session as discussed in the examples which follow.

The prompt construction unit 126 constructs a prompt based on the natural language prompts provided by users of the native application 114 or the web application 190 and/or additional information. The additional information may include specific information that can be used by the language model 128 for generating a visualization based on the content of the online communications session. The additional information can include a selected candidate visualization layout that indicates how the visualization should be formatted. The additional information can also include at least a portion of the transcript, at least a portion of the chat messages, and/or at least a portion of the text of any attachments shared by participants of the online communication session.

The topic model 134 is a language model that is trained to receive a textual input and to determine a topic or topics associated with the textual input. The topic model 134 is provided an excerpt of the transcript and/or the chat messages associated with an online communication session to obtain a current topic for the The visualization support unit 180 provides visualization layout templates that can be used to create visualizations of an online communication session. The visualization support unit 180 selects candidate visualization layouts based on the predicted meeting categories output by the meeting categorization model 130. In some implementations, the generative language model 128 generates a layout for the visualizations without relying on a visualization layout template. The visualization support unit 180 also maintains trigger information for trigger conditions that cause the application services platform 110 to automatically create a visualization for an online communication session and/or to prompt a participant of the online communication session whether such a visualization should automatically be created for the online communication session. The trigger conditions are associated with a predicted intent of the participants of the online communication session under various circumstances. Additional details of the visualization support unit are discussed below with respect to FIG. 2.

The moderation services 168 analyze natural language prompts input by the user for interacting with the language model 128 of the AI services 124, and textual content generated by the language model 128 and the transcription model 132 to ensure that potentially objectionable or offensive content is not generated or utilized by the application services platform 110. If potentially objectionable or offensive content is detected, the moderation services 168 provides a blocked content notification to the client device 105 indicating that the natural language prompt and/or the content generated by the language model 128 or the transcription model 132 included content that is blocked.

The moderation services 168 performs several types of checks on the natural language prompts entered by the user in the native application 114 or the web application 190 and/or content generated by the language model 128 or the transcription model 132. The content moderation unit 170 is implemented by a machine learning model trained to analyze the textual content of these various inputs to perform a semantic analysis on the textual content to predict whether the content includes potentially objectionable or offensive content. The language check unit 172 performs another check on the textual content using a second model configured to analyze the words and/or phrase used in textual content to identify potentially offensive language. The guard list check unit 174 is configured to compare the language used in the textual content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 168 may vary from implementation to implementation. If one or more of these checks determines that the textual content includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the application that submitted the natural language prompt which could not be processed. The user interface provides information indicating why the blocked content notification was issued in some implementations. The user may attempt to refine the natural language prompt to remove the potentially offensive content. A technical benefit of this approach is that the moderation services 168 provides safeguards against both user-created and model-created content to ensure that prohibited offensive or potentially offensive content is not presented to the user in the native application 114 or the web application 190. If the moderation services 168 detects potentially objectionable or offensive content in the transcript generated by the transcription model 132, the potentially objectionable or offensive content is redacted from the transcript, but the remainder of the transcript is made available to the participants to the online communication session so that the entire transcript of the session is not lost.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, in some implementations, that enables users to participate in online communication sessions and collaborate with meeting participants in creating and/or modifying visualizations of content associated with the meeting. Such visualizations may be created by the application services platform 110 according to the techniques described herein. The web application 190 also enables users to participate in online communication sessions and collaborate with meeting participants in creating and/or modifying visualizations of content associated with the meeting. The browser application 112 can be used for accessing and viewing web-based content provided by the application services platform 110. In such implementations, the application services platform 110 implements one or more web applications, such as the web application 190, that enables users to participate in online communication sessions and collaborate with meeting participants in creating and/or modifying visualizations of content associated with the meeting. The application services platform 110 supports both the native application 114 and a web application 190 in some implementations, and the users may choose which approach best suits their needs.

Figure 1B:
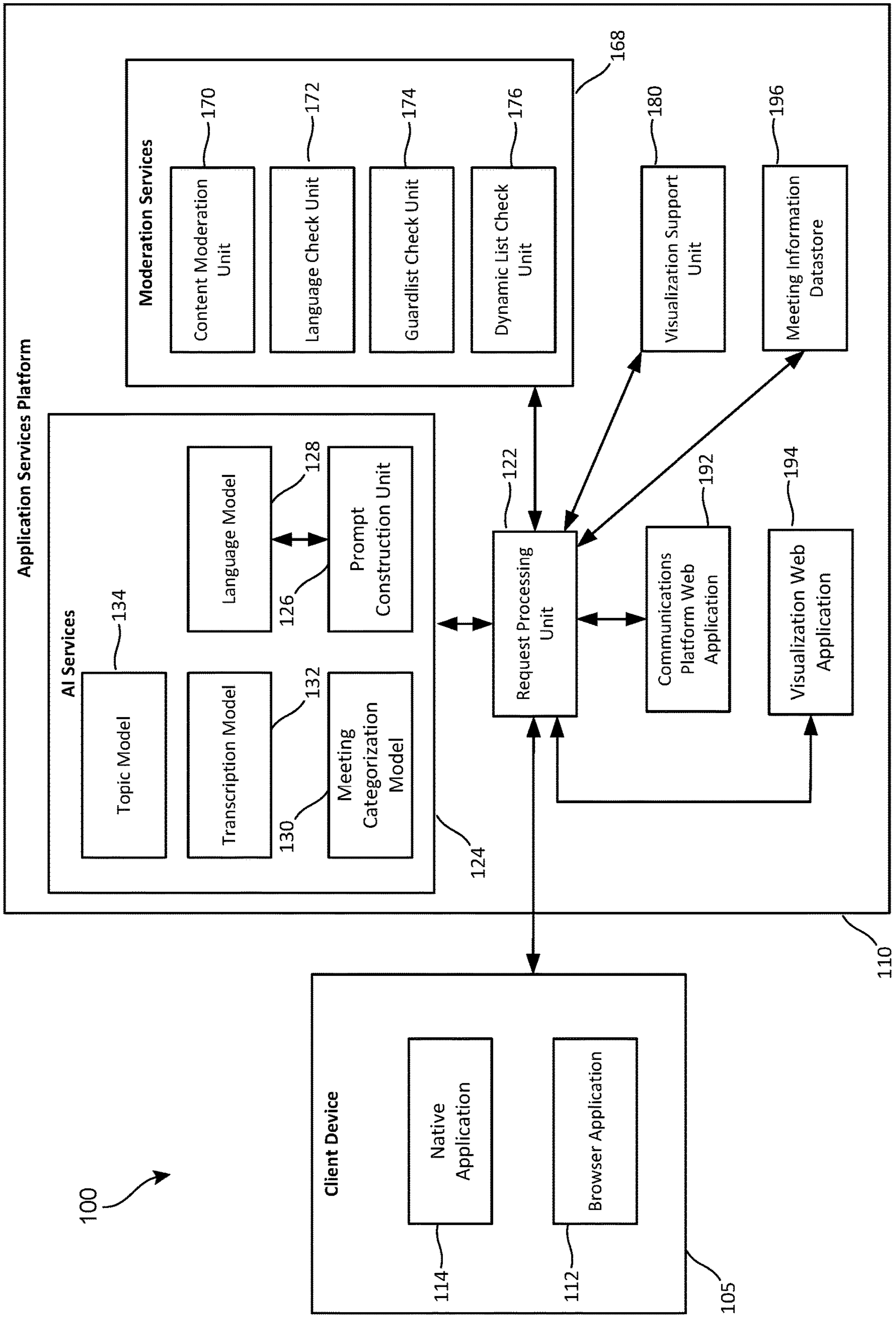
FIG. 1B is a diagram of another example computing environment similar to that shown in FIG. 1A in which the techniques for automatically generating visualizations of meeting content described herein are implemented but in which separate communications applications and visualization applications are implemented.

FIG. 1B is a diagram of another example of the computing environment 100 which is similar to the implementation shown in FIG. 1A. The example implementation shown in FIG. 1B, like the example implementation shown in FIG. 1A, can also be used to implement the techniques for automatically generating visualizations of meeting content described herein. However, the example implementation shown in FIG. 1B includes separate communications applications and visualization applications. Rather than a single web application 190 as in FIG. 1A, the example implementation of the application services platform 110 shown in FIG. 1B instead includes a communications platform web application 192 and a visualization web application 194. The communications platform web application 192 enables users to establish and/or participate in online communication sessions. The communications platform web application 192 can provide other services, such as but not limited to transcription of the speech detected in the audio portion of the online communication session, a chat features that enables participants invited to participate in an online communication session to exchange messages before, during, and/or after the online communication session, file sharing tools that enable participants to the online communication session to share files with other participants, and collaboration tools that enable the participants of the meeting to collaborate with other participants to the online communication session to create content. The collaboration tools can include creation of the visualization of the meeting content. In some implementations, the communications platform web application 192 is implemented by Microsoft Teams®. Other implementations can be implemented by other communications platforms. The communications platform web application 192 can integrate with other applications, such as the visualization web application 194 to provide additional services and/or functionality to participants of an online communication session. The visualization web application 194 enables participants to create a virtual whiteboard that enables users to collaborate on a virtual whiteboard in which the users can type, draw, write, or otherwise interact with the virtual whiteboard using a keyboard, mouse, stylus pen, touchscreen, voice, and/or other input. Participants to an online communication session can access the communications platform web application 192 and/or the visualization web application 194 using the browser application 112 of the client device.

The native application 114 in the example implementation FIG. 1B can implement at least a portion of the communications platform web application 192 locally on the client device 105. Some of the features and/or services provided by the native application 114 may be obtained from the communications platform web application 192. Furthermore, the visualization web application 194 can integrate with the native application 114 to provide the visualization functionality discussed above.

The remaining elements of the application services platform 110 shown in FIG. 1B not expressly described above function similarly to those described above with respect to the example implementation shown in FIG. 1A.

Figure 2:
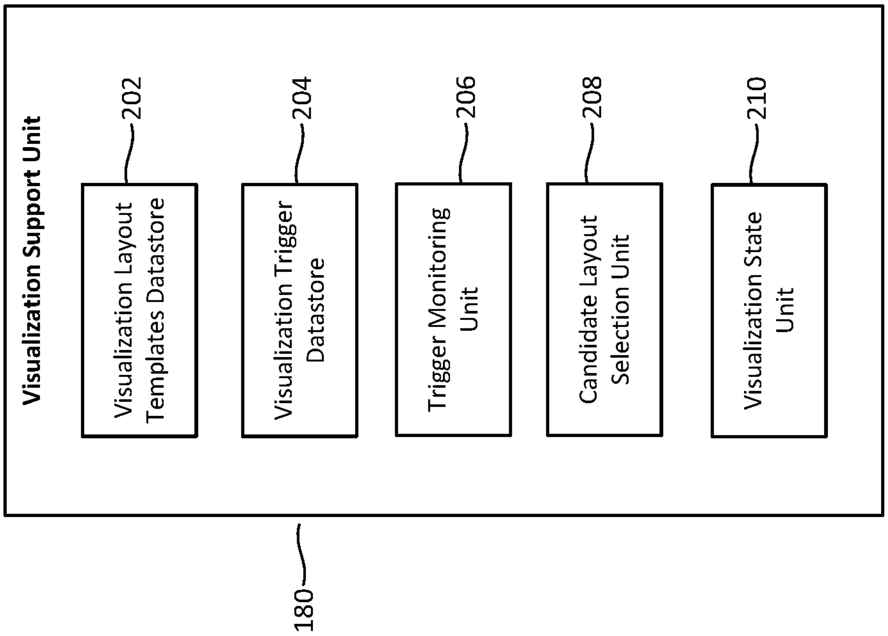
FIG. 2 is a diagram showing an example implementation of the visualization support unit of the application services platform 110 shown in FIG. 1.

FIG. 2 is a diagram showing an example implementation of the visualization support unit 180 of the application services platform 110 shown in FIG. 1. The visualization support unit 180 provides visualization layout templates that can be used to create visualizations of content of an online communication session. The templates are stored in the visualization layout templates datastore 202, which is a persistent datastore in the memory of the application services platform 110. The visualization layout templates can include templates for various types of visualizations that may be generated from the online communication session content to encourage engagement and contribution by the participants of the online communication session. The templates may include but are not limited to brainstorming session visualizations, pros and cons listings, affinity diagrams, and/or other types of visualizations that may be generated from the content of the online communication session and presented to the participants of the online communication session. As discussed in the preceding examples, some implementations do not utilize the visualization layout templates and the language model 128 generates the layout for the visualization rather than relying on templates. In yet other implementations, users are provided an option in the native application 114, the web application 190, and/or the communications platform web application 192 to select whether the visualization layout templates are used or the language model 128 generates the layout without relying on a visualization layout template.

The visualization trigger datastore 204 is another persistent datastore in the memory of the application services platform 110. The visualization trigger datastore 204 stores trigger information for trigger conditions. These trigger conditions are associated with various conditions are indicative of the intent of the participants of the application services platform 110 to have the application services platform 110 automatically generate a visualization for the online communication session. The application services platform 110 creates the visualization for an online communication session and/or prompts a participant of the online communication session whether such a visualization should be created in response to the occurrence of the trigger condition. An administrator may configure the specific trigger conditions included in the visualization trigger datastore 204 for a particular implementation. Furthermore, the visualization trigger datastore 204 may be populated with a set of default trigger conditions and the administrator may modify the default trigger conditions to suit the particular implementation. Each trigger condition identifies one or more conditions that must occur to satisfy the trigger condition and one or more actions to be taken by the application services platform 110 in response to the trigger condition being satisfied. The trigger conditions may be grouped into three categories: (1) manual start trigger conditions, (2) reactive start trigger conditions, and (3) proactive start trigger conditions. Manual start trigger conditions are based on a participant of an online communication session taking some action to cause the application services platform 110 to automatically generate a visualization for the online communication session. In a non-limiting example, the participant clicks on or otherwise activates a control in the user interface of the communications platform application implemented by the native application 114, the web application 190, or the communications platform web application 192. The activation of the control indicates to the application services platform 110 that a visualization of the content of the online communication session should be created. The reactive start trigger conditions are based on the content of the natural language prompts that the online communication session participant inputs during the online communication session. Examples of such inputs are shown in FIGS. 4A-4E, which provide examples of a user interface of a communication platform application and are described in detail below. The natural language prompt may include questions and/or certain key phrases that indicate that the participant wants the application services platform 110 to create a visualization for the online communication session. Some examples of such questions and/or key words are phrases are discussed with respect to FIGS. 4A-4E. The proactive start trigger conditions are based on various attributes of the online communication session. The proactive start trigger conditions can be based on the contents of the meeting transcript, the contents of meeting chat messages, calendar invite information for the online communication session, how much time has elapsed since the meeting has been initiated and/or since one of the participants has shared screen contents, and/or whether any of the participants are currently sharing the contents of an application via the native application 114, the web application 190, or the communications platform web application 192. The proactive start trigger conditions are conditions that are indicative that the participants of the online communication session may benefit from a visualization of the content of the online communication session. In a non-limiting example, the application services platform 110 service platform may automatically suggest visualizing the meeting content once enough information has been collected that a meeting category can be determined. A proactive start trigger condition can be defined to be satisfied when enough information has been collected for the online meeting category such that the meeting categorization model 130 has enough information to predict the meeting category for the online meeting. The length of the meeting transcript, the amount of time that has elapsed since the online communication session began, and/or the amount of message included in the meeting chat may all be indicative of the whether there is sufficient information available for the meeting categorization model 130 to predict the meeting category. The text of the calendar invite and/or the text of any attachments to the meeting invite and/or to the meeting chat may also include information indicative of the meeting category.

The trigger monitoring unit 206 monitors participant inputs, the meeting transcript, the meeting chat, and other meeting related information discussed above. The trigger monitoring unit 206 accesses the visualization trigger datastore 204 to obtain the trigger condition information and analyzes the various inputs to determine whether any of the trigger conditions have been satisfied. If a trigger condition has been satisfied, the trigger monitoring unit 206 performs the one or more actions associated with that trigger condition. These actions may include initializing a new interactive visualization and/or updating the visualization information of an existing interactive visualization. Additional details of how the one or more actions are performed are described in greater detail in the examples which follow.

The candidate layout selection unit 208 receives the predicted meeting category output by the meeting categorization model 130 and identifies the candidate visualization templates from the visualization layout templates datastore 202. The candidate layout selection unit 208 ranks the candidate visualization layouts selected for the meeting category based on a frequency with which the candidate visualization layouts are selected for that meeting category and selects a set of highest-ranking candidate visualization layouts to include in the set of candidate visualization layouts. The candidate layout selection unit 208 selects a predetermined number of candidate visualization layouts to present to a participant or participants of the online communication session. In some implementations, an administrator is able to customize the predetermined number of candidate visualization layouts presented. The candidate layout selection unit 208 causes the candidate visualization layouts to be presented on a user interface of the communication platform application implemented by the native application 114, the web application 190, or the communications platform web application 192 depending upon the implementation of the application services platform 110. The participant may then select the layout of the visualization to be generated. The language model 128 of the AI services 124 is used to generate, at least in part, the content for the visualization based on the visualization template selected by the participant. Alternatively, in some implementations, the candidate layout selection unit 208 automatically selects the visualization template to be utilized for the visualization. Additional details of the generation of the visualization are described in greater detail in the examples which follow.

The visualization state unit 210 maintains the state of the visualization information so that the state of visualization information used to populate the interactive visualization can be automatically updated based on the ongoing conversation in the online communication session. The visualization state unit 210 stores information about the current topic of conversation, as determined by the topic model 134. The visualization state unit 210 obtains an except of the transcript and/or the chat messages associated with the online communication session and provides the excerpts to the topic model 134 for analysis. The visualization state unit 210 periodically checks for a change in topic in some implementations. In a non-limiting example, every m minutes, the visualization state unit 210 obtains an excerpt of the transcript and/or the chat messages reflecting the last m minutes and provides the excerpted information to the AI services 124 for analysis by the topic model 134. The current topic output by the topic model 134 is compared with the previous topic. If the topic has not changed, the visualization state unit 210 causes the trigger monitoring unit 206 to check whether a layout synchronization trigger condition has been satisfied so that the trigger monitoring unit 206 will update the visualization content of the current visualization with additional information included in the transcript and/or chat since the visualization information was last updated. Otherwise, if the topic has changed, the visualization state unit 210 provides an indication to the trigger monitoring unit 206 that a layout change trigger condition has occurred, which indicates that the topic has changed, and a new visualization can be created for the new topic.

Figure 3:
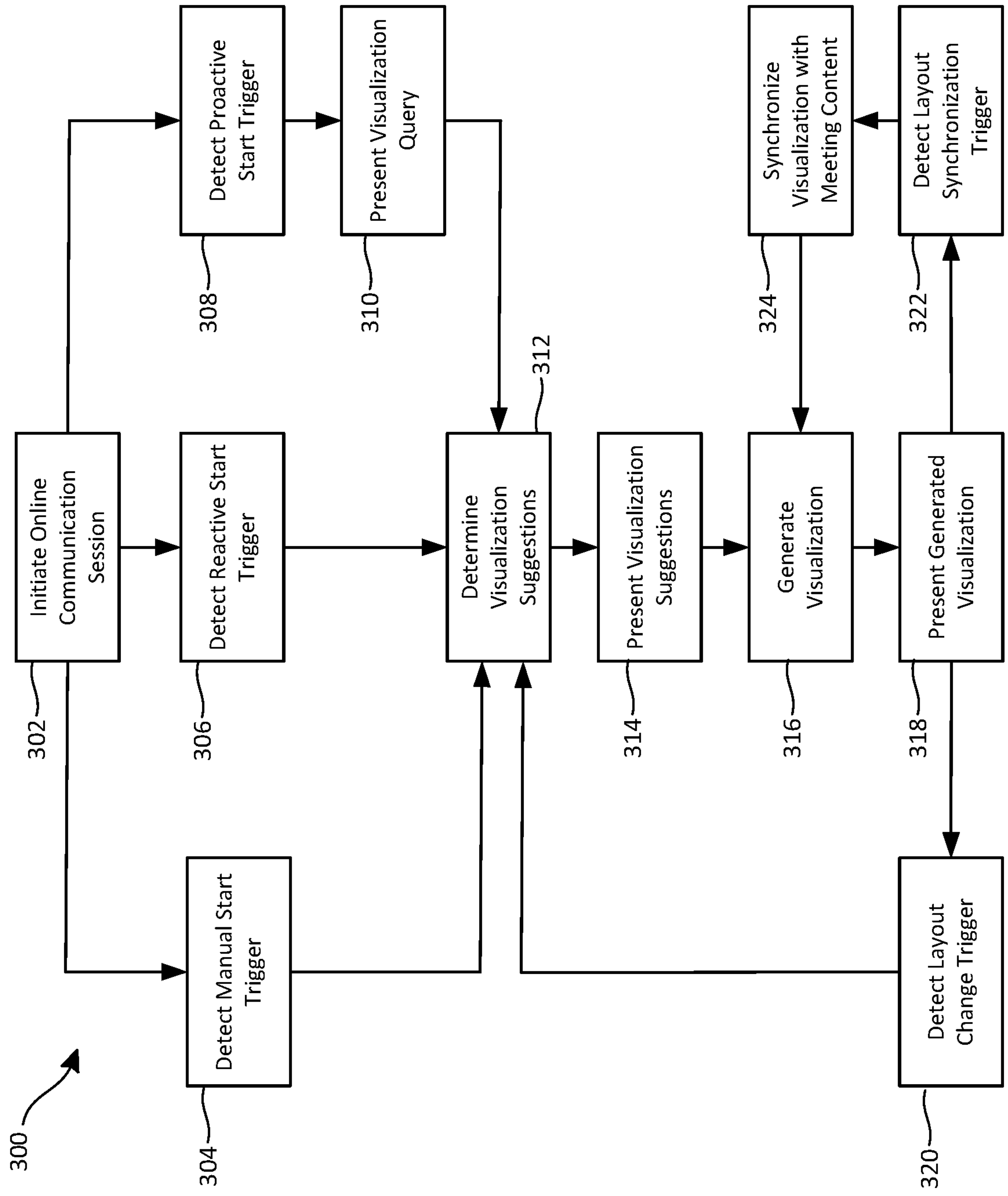
FIG. 3 is a flow diagram showing an example process for automatically creating visualization content for an online communication session according to the techniques provided herein.

FIG. 3 is a flow diagram showing an example process 300 for automatically creating visualization content for an online communication session according to the techniques provided herein. The process 300 includes an operation 302 of initiating the online communication session. The operation 302 may be automatically executed by the application services platform 110 at the time at which the online communication session is scheduled in a calendar invite. In other implementations, the operation 302 is performed in response to an organizer of the meeting accessing the communication platform via the native application 114, the web application 190, or the communications platform web application 192 and initiating the meeting. The client devices 105 of the other participants to the online communication session may then connect to the online communication session in response the participants clicking on or otherwise activating a control in the user interface of the communications platform application that request to join to online communication session. The organizer of the online communication session must admit the participants to the online communication session in some implementations.

The process 300 then continues with the trigger monitoring unit 206 monitoring the online communication session as discussed in the preceding examples to determine whether a trigger condition has been satisfied. In operation 304, the trigger monitoring unit 206 detects a manual start trigger condition has been satisfied. In operation 306, the trigger monitoring unit 206 detects that a reactive start trigger condition has been satisfied. In operation 308, the trigger monitoring unit 206 detects that a proactive start trigger condition has been satisfied. The process 300 continues to operation 312 in response to the trigger monitoring unit 206 detecting that a manual start trigger condition, or a reactive start trigger condition has been satisfied. However, the process 300 continues to operation 310 in response to the trigger monitoring unit 206 detecting that a proactive start trigger condition has been satisfied. In operation 310, a participant of the online communication session is prompted whether a visualization should automatically be generated and presented to the participants of the online communication session. The trigger monitoring unit 206 causes a prompt to be presented on a user interface of the client device 105 of the participant. The participant can then respond via the prompt with an indication that the visualization should be created or an indication that the visualization should not be created. If the participant indicates that the visualization should be created, the process 300 proceed to operation 312. Otherwise, if the participant indicates that the visualization should not be created, the trigger monitoring unit 206 continues to monitor for the occurrence of a trigger condition. The participant may be the organizer of the online communication session, or another participant selected to make the decision whether the visualization should be automatically generated. The participant who is prompted by the trigger monitoring unit 206 may be a participant in the online communication session that is currently speaking at the time that the trigger monitoring unit 206 determines that the proactive start trigger has been satisfied.

In operation 312, the candidate layout selection unit 208 obtains the candidate visualization layouts from the visualization layout templates datastore 202 and causes the client device 105 of the participant to present the candidate visualization layouts to the participant in operation 314. The participant selects a candidate visualization layout from among the candidate visualization layouts presented to the participant and the client device 105 of the participant provides an indication of the selected candidate visualization layout to the candidate layout selection unit 208.

In operation 316, the application services platform 110 generates the selected visualization. The prompt construction unit 126 generates the prompt that is provide to the language model 128 to obtain the visualization generated by the language model 128. The request processing unit 122 includes the selected candidate visualization layout as one of the inputs to the prompt construction unit 126. The prompt construction unit 126 uses the candidate visualization layout to provide context to the model as to what the visualization generated by the model should look like. The request processing unit 122 also includes at least a portion of the transcript, at least a portion of the chat messages, and/or at least a portion of the text of any attachments shared by participants of the online communication session. The prompt construction unit 126 may format the input information into a standardized format that is recognized by the language model 128. The request processing unit 122 may also provide a natural language prompt input by a participant of the online communication session to the prompt construction unit 126, and the prompt construction unit 126 includes the natural language prompt to the language model 128 to provide context to what the language model 128 regarding the visualization to be created.

In operation 318, the generated visualization is presented on a user interface of the client devices 105 of the participants of the online communication session. Depending upon the implementation, the native application 114, the web application 190, or the visualization web application 194 presents the visualization. In implementations in which the visualization web application 194 presents the generated visualization, the presentation may be within a window of the user interface of the communications platform web application 192 or of the native application 114. The participants to the online communication session can then begin interacting with and contributing to the visualization. The request processing unit 122 of the application services platform 110 can coordinate receiving the updates made by each of the participants, updating a state of the visualization information representing the visualization being shared, and pushing these changes out to the client devices 105 of the participants of the online communication session. The request processing unit 122 can also store content associated with the online communication session, including the visualization information in the meeting information datastore 196.

The trigger monitoring unit 206 can listen for layout change triggers and layout synchronization triggers once the visualization has been generated. In operation 320, the trigger monitoring unit 206 detects a layout change trigger condition has been satisfied. The layout change triggers are associated with trigger conditions associated with a change in topic in the online communication session. When the topic of conversation in the online communication session changes, the current visualization can be saved to the meeting information datastore 196, and a new visualization instantiated for the new topic of conversation. In some implementations, the participant that initiated the current visualization clicks on or otherwise activates a control on the user interface of the native application 114, the web application 190, or the communications platform web application 192. The AI services 124 includes a language model trained to analyze textual inputs, such as but not limited to the transcript and chat messages to predict a current subject matter of the online communication session. The trigger monitoring unit 206 periodically checks the current subject matter of the online communication session to determine whether a change in subject matter has occurred. In response to the determining that a subject matter change has occurred, the process 300 can return to operation 312 in which a new set of visualization suggestions are generated for the online communication session.

The trigger monitoring unit 206 detects a layout synchronization trigger condition has been satisfied. The layout synchronization triggers cause the trigger monitoring unit 206 to synchronize the contents of the visualization with the current state of the online meeting session. Updates to the transcript, the meeting chat, and any changes that were made manually to the visualization by participants of the online communication session are considered when updating the visualization. The layout synchronization is intended to include any new ideas that were discussed in the transcript and/or the meeting chat in an updated version of the visualization. The manual edits made to the visualization to add, edit, or delete ideas by participants are also considered so that ideas that have already been added by the participants aren't duplicated and ideas deleted by the participants are not reintroduced in the new version of the visualization. The layout synchronization triggers may be automatic, semi-automatic, or manual. The automatic trigger condition is satisfied if any changes to the transcript and/or meeting chat are detected. The contents of the visualization are updated automatically and substantially in real time. For the semi-automatic synchronization trigger condition, the trigger monitoring unit 206 checks periodically whether the participants have made any changes to the contents of the visualization. For example, the trigger monitoring unit 206 may check every few minutes whether the transcription and/or the chat has changed and update the visualization accordingly. The current meeting transcript, meeting chat, and manual edits made to the visualization by the participants of the online communication application are provided to the prompt construction unit 126 of the AI services 124 to construct a prompt to cause the language model 128 to generate an updated version of the visualization information to be used to populate a virtual whiteboard to present to the participants of the online communication session. The prompt construction unit 126 formats the transcript information, the chat information, and the manual edits information into a standardized format that is recognized by the language model 128. The prompt construction unit 126 may also include the previously generated visualization information output by the language model 128 to provide the model with the previous state of the visualization before the manual edits were made by the participants. Any new ideas introduces in the meeting transcript and/or the meeting chat are included in the updated version of the visualization information output by the language model 128. The updated visualization information is then presented to the participants of the online communication session via the native application 114, the web application 190, and/or the communications platform web application 192.

In an alternate implementation of the process 300 shown in FIG. 3, the layout of the visualization is generated by the language model 128 without relying on visualization layout templates. As discussed in the preceding examples, some implementations allow a meeting organizer or other participant select between the use of visualization layout templates and visualization layouts generated by the language model 128 without templates. In other implementations, all the visualization layouts are automatically generated by the language model 128. In some such implementations, the candidate layout selection unit 208 constructs a prompt to the language model 128 to generate a predetermined number of candidate visualization layouts. The prompt construction unit 126 provides the prompt to the language model 128 as an input and obtains the candidate visualization layouts. The prompt may include at least a portion of the transcript, chat messages, and/or other additional data associated with the online communication session. The candidate visualization layouts may be populated with sample data or may be populated with the data from the transcript, chat messages, and/or other additional data associated with the online communication session. In such implementations, the multiple visualizations are generated and the presented to the participant and the participant can select from among these visualizations. Therefore, the order of execution of operations 314 and 316 are reversed in such implementations.

In another alternate implementation of the process 300 shown in FIG. 3, the layout of the visualization is generated by the language model 128 automatically without relying on the visualization layout templates. However, the operations 312 and 314 are skipped in this alternative implementation. The user in not presented with candidate visualization layout templates. Instead, the language model 128 generates the visualization in operation 316 at least a portion of the transcript, chat messages, and/or other additional data associated with the online communication session.

The meeting category may also be provided as one of the inputs to the language model 128 in the implementations discussed above in which the language model 128 generates the layout for the visualization. The meeting category can be included as part of the prompt provided as an input to the language model 128. This approach provides the language model 128 with additional context that may help improve the layout generated by the language model 128 for the online communication session.

FIG. 4A-4E are diagrams showing an example user interface 405 of an online communications platform application according to the techniques disclosed herein. The user interface 405 may be implemented by the native application 114, the web application 190, or the communications platform web application 192. The user interface 405 includes a content pane 415, a meeting assistant pane 435, a natural language prompt field 440, and participant indicators 475. The participant indicators 475 provide an icon, a photo, and/or a video feed of each of the participants to the online communication session. The content pane 415 provides an area on the user interface in which content shared by one of the participants to the online communication session is displayed. The content pane 415 can also be used to present a visualization of the online communication session content as discussed in the preceding examples. The visualization in the examples shown in FIGS. 4A-4E is a virtual whiteboard that enables user to collaborate in which the users can type, draw, write, or otherwise interact with the virtual whiteboard using a keyboard, mouse, stylus pen, touchscreen, voice, and/or other input. The user is a participant of the online communication session. The meeting assistant pane 435 provides the user with a user interface for inputting natural language prompts to a generative model, such as the language model 128 discussed in the preceding examples. The natural language prompts can be used to cause the language model 128 to generate information about the meeting and/or to generate visualizations of the meeting content in a virtual whiteboard. The prompt field 440 provides a field in which the user can enter a natural language prompt.

Figure 4A:
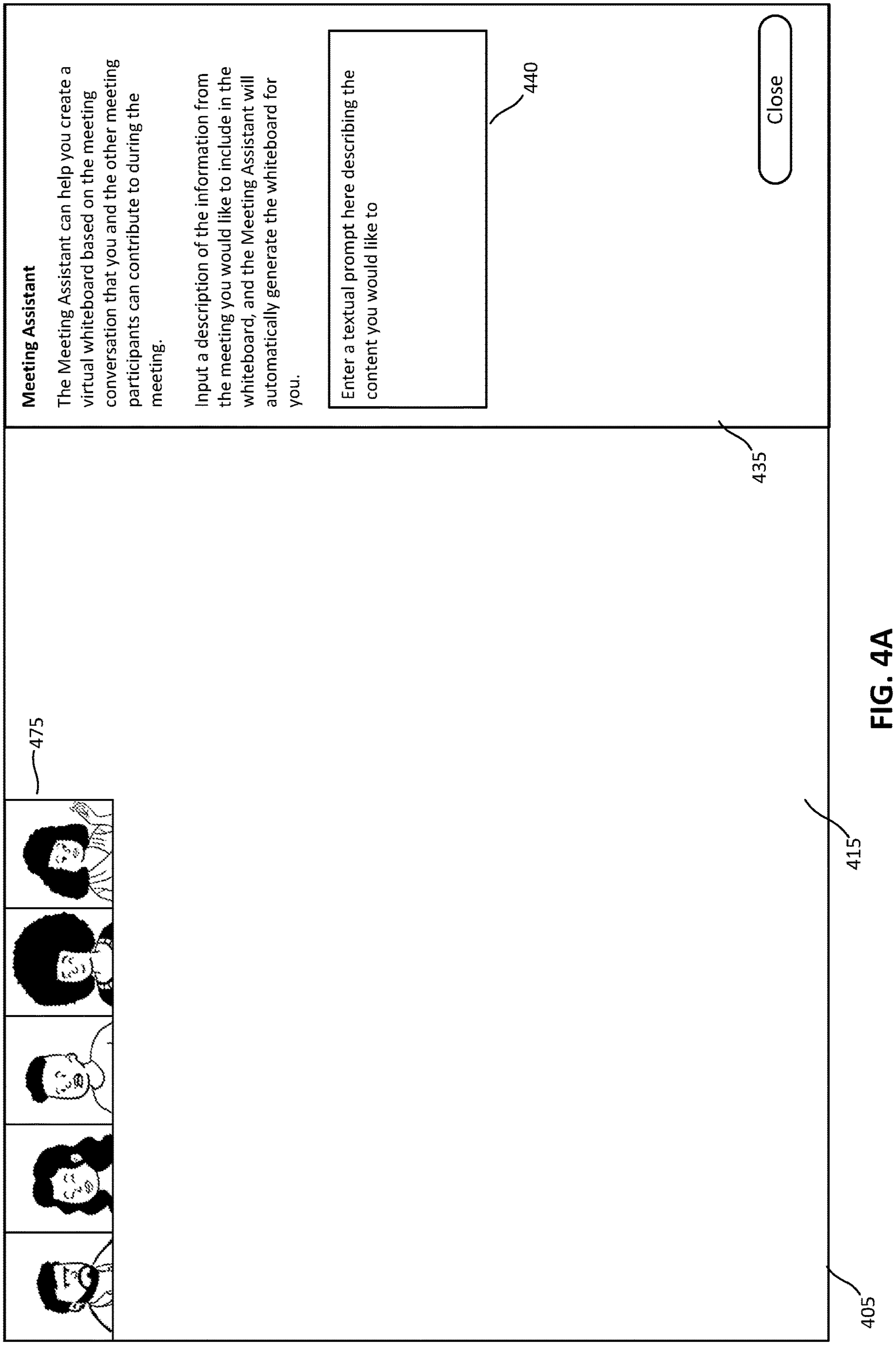
FIG. 4A-4E are diagrams showing an example user interface of an online communications platform application according to the techniques disclosed herein.
Figure 4B:
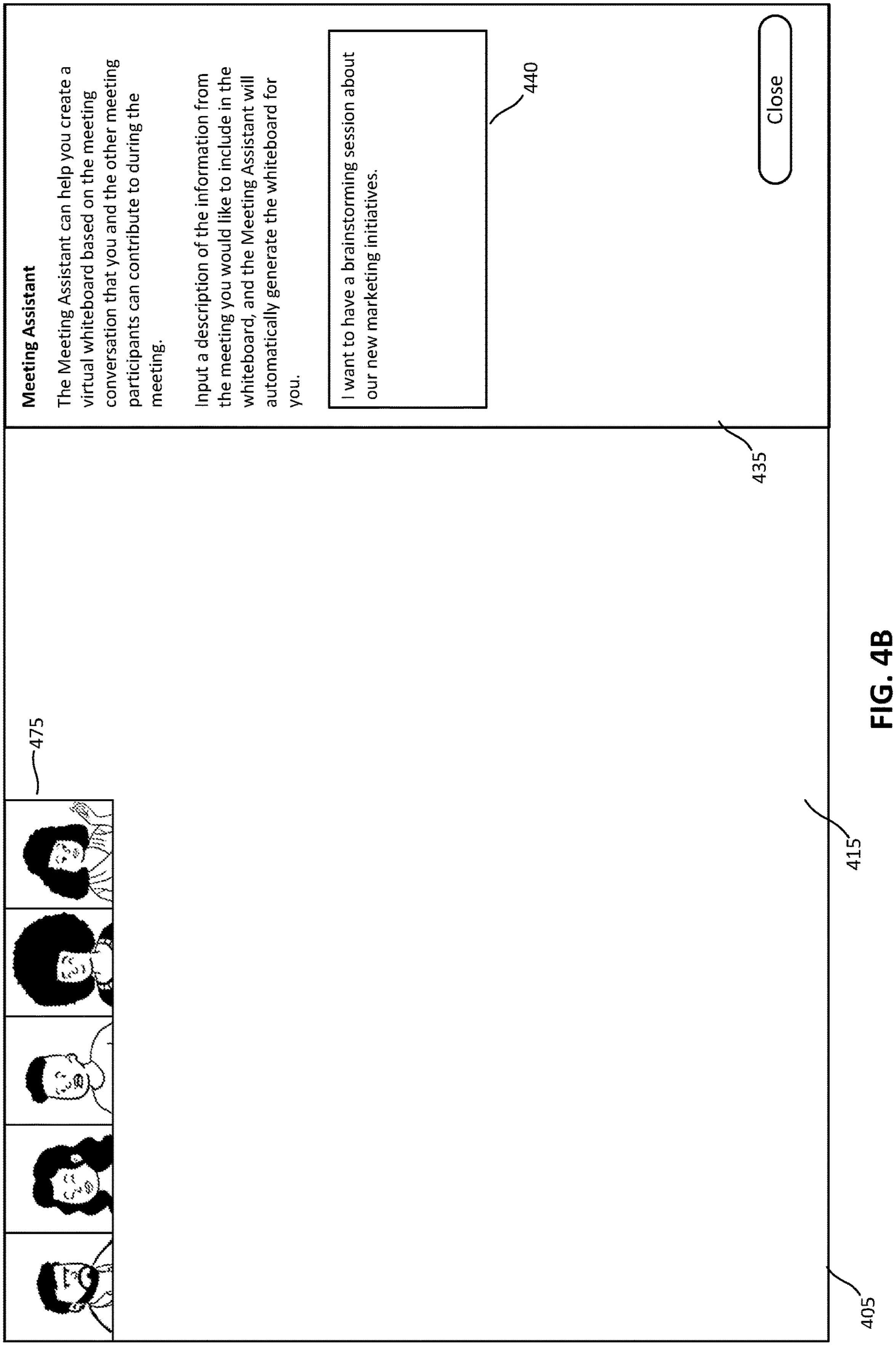
Figure 4C:
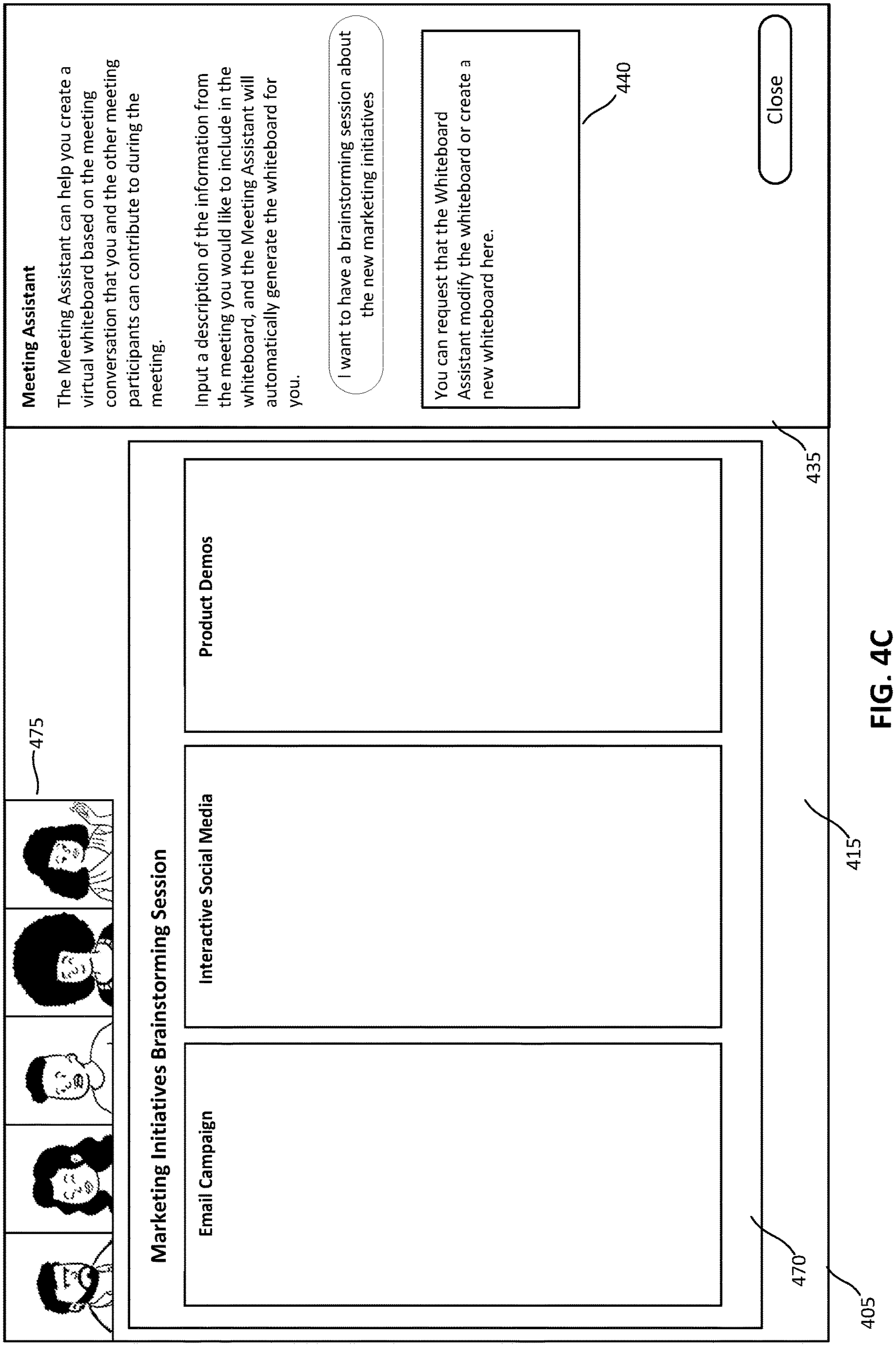

FIG. 4B shows an example in which the user has entered a prompt to cause the language model 128 to generate a visualization for a brainstorming session based on the marketing initiatives that have been discussed during the online communication session. In the examples shown in FIG. 4B, the user has entered keywords or phrases in the natural language prompt that are recognized as a reactive start trigger condition. The trigger monitoring unit 206 detects the occurrence of the trigger condition and causes the request processing unit 122 to send a request to the prompt construction unit 126 to generate a prompt to the language model 128 to generate a visualization for a brainstorming session. The request processing unit 122 retrieves the transcript of the online communication session from the meeting information datastore 196 and/or the from the transcription model 132. The request processing unit 122 can also obtain messages from the meeting chat. The request processing unit 122 provides the natural language prompt, the transcript, and the messages from the meeting chat to the prompt construction unit 126, and the prompt construction unit 126 formats this information into a prompt to be submitted to the language model 128. The request processing unit 122 can also obtain the visualization layout template for the brainstorming session from the visualization support unit 180 and provide the template as an input to the prompt construction unit 126. The language model 128 generates the visualization for the brainstorming meeting according to the format of the template and the information included in the transcript and chat messages. FIG. 4C shows an example of the visualization 470 being displayed in the content pane 415 of the user interface 405.

Figure 4D:
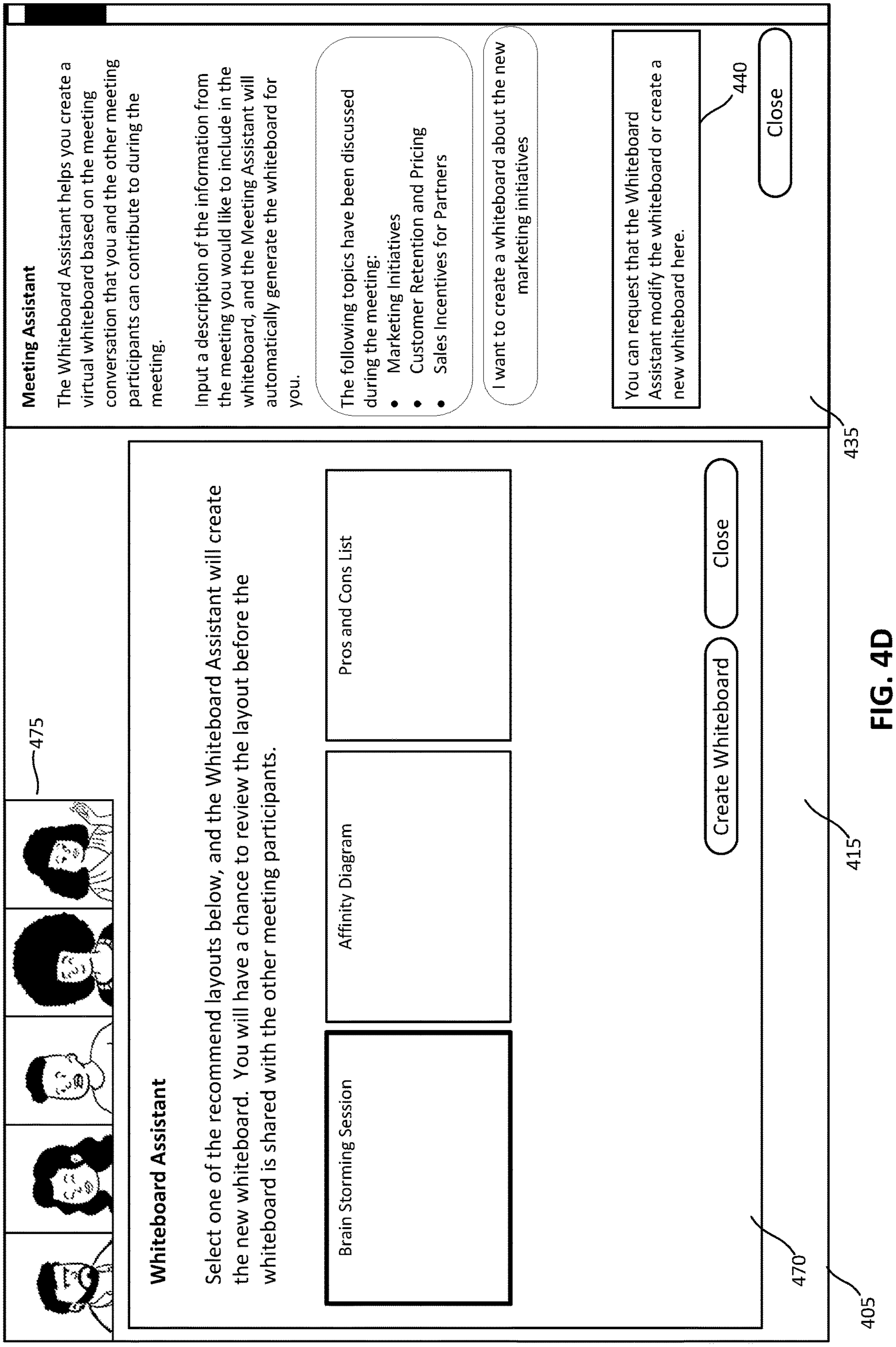
Figure 4E:
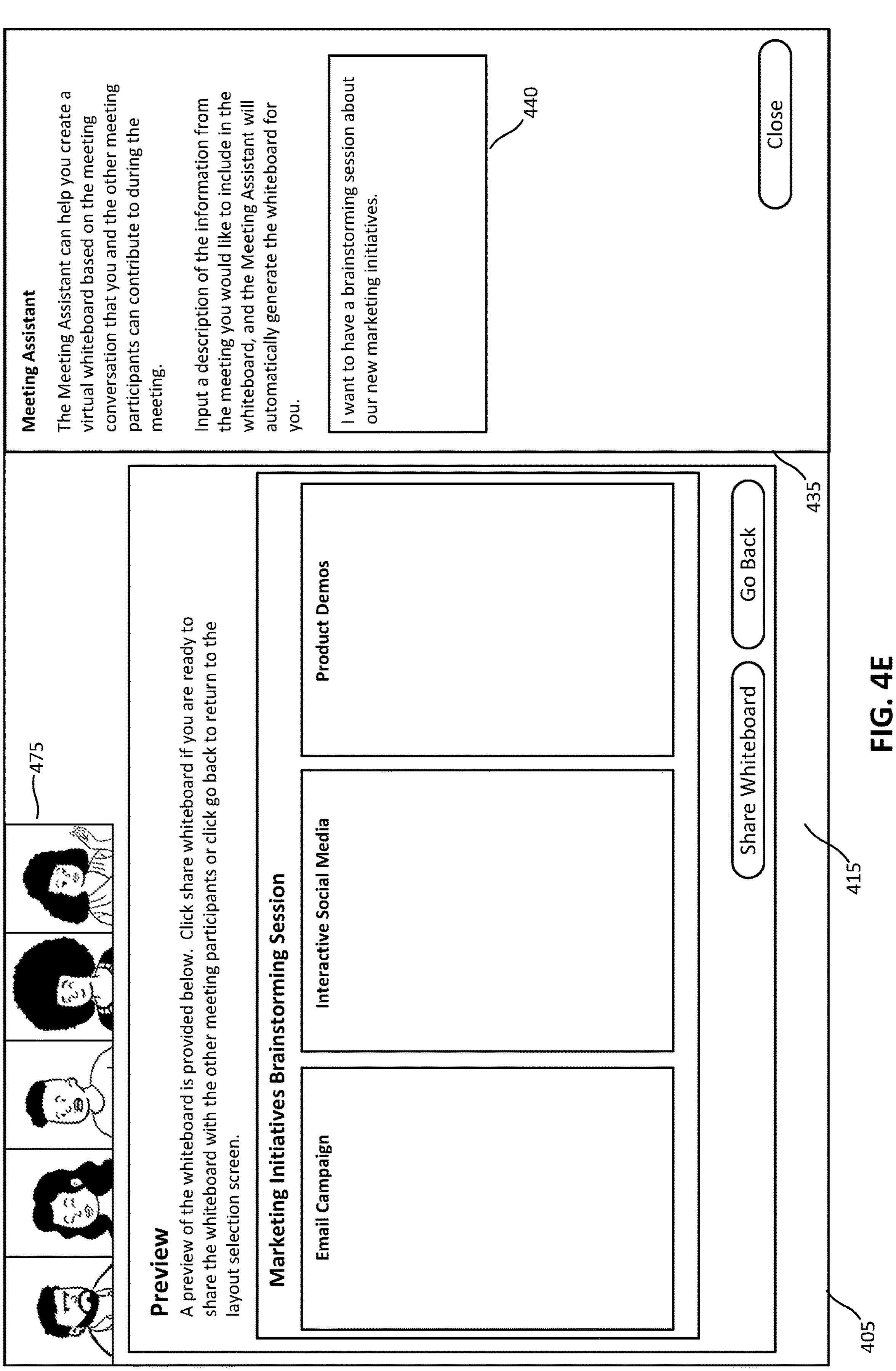

FIG. 4D shows another example in which the user has entered a prompt requesting that the meeting assistant create a visualization for marketing initiatives. In this example implementation, the user did not specify a particular format for the visualization. Therefore, the candidate layout selection unit 208 selects a set of candidate layouts based on the meeting category and presents these candidates to the user. FIG. 4E provides a preview of the selected layout to the user in response to the user clicking on or otherwise activating the create whiteboard button on FIG. 4D. The user may then click on or otherwise activate the share whiteboard button to cause the virtual whiteboard to be shared with the other meeting participants. The participants can then interact with the virtual whiteboard from their respective client devices 105.

Figure 5:
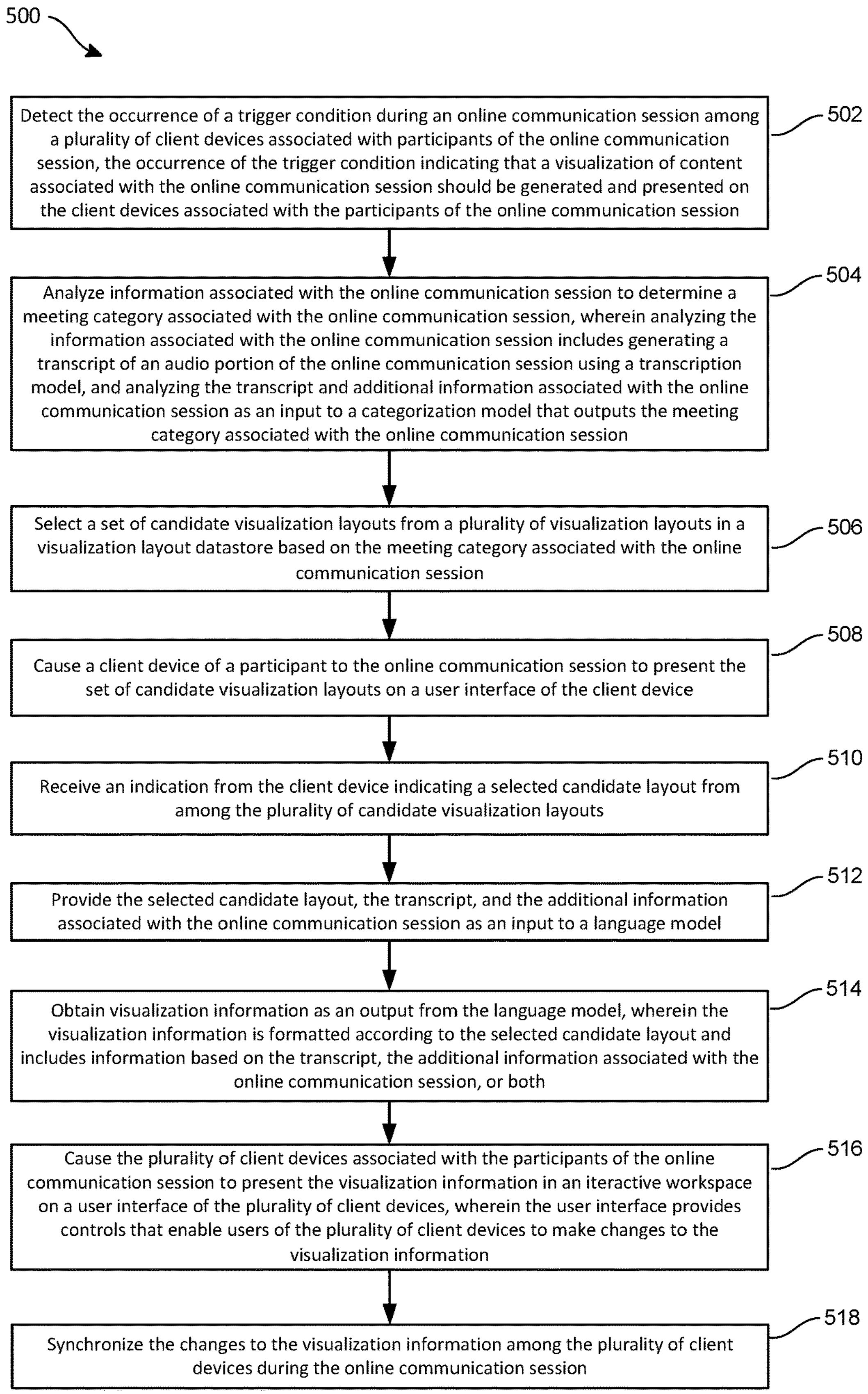
FIG. 5 is a flow chart of an example process for automatically generating visualizations of meeting content according to the techniques disclosed herein.

FIG. 5 is a flow chart of an example process 500 for automatically generating visualizations of meeting content according to the techniques disclosed herein. The process 500 can be implemented by the application services platform 110 as discussed in the preceding examples.

The process 500 includes an operation 502 of detecting an occurrence of a trigger condition during an online communication session among a plurality of client devices associated with participants of the online communication session. The occurrence of the trigger condition indicates that a visualization of content associated with the online communication session should be generated and presented on the client devices 105 associated with the participants of the online communication session. As discussed in the preceding examples, the trigger monitoring unit 206 monitors various aspects of the online communication session to determine whether a trigger condition is satisfied that indicates that a visualization should be created for the online communication session.

The process 500 includes an operation 504 of analyzing information associated with the online communication session to determine a meeting category associated with the online communication session. Analyzing the information associated with the online communication session includes generating a transcript of an audio portion of the online communication session using a transcription model, and analyzing the transcript and additional information associated with the online communication session as an input to a categorization model that outputs the meeting category associated with the online communication session. The transcription model 132 generates a transcript of the online communication session, and the categorization model 130 analyzes the transcript and additional information to determine a meeting category for the online communication session. The additional information can include all or portion of the meeting chat, a number of meeting, attendee information (such as the job title, role, or other information), and/or information obtained from the calendar invite associated with the meeting. The information from the calendar invite may include but is not limited to a meeting title, a meeting description, and attached information and/or textual content extracted from the attachments to the calendar invite. The meeting categorization model 130 is trained to predict a meeting category from among the supported meeting categories based on the information available to the model.

The process 500 includes an operation 506 of selecting a set of candidate visualization layouts from a plurality of visualization layouts in a visualization layout datastore based on the meeting category associated with the online communication session and an operation 508 of causing a client device of a participant to the online communication session to present the set of candidate visualization layouts on a user interface of the client device 105. The candidate layout selection unit 208 selects the set of candidate visualization layouts from the visualization layout templates datastore 202, and the set of candidate visualization layouts are presented on a user interface of the client device 105 of the participant of the online communication session.

The process 500 includes an operation 510 of receiving an indication from the client device indicating a selected candidate layout from among the plurality of candidate visualization layouts. As discussed in the preceding examples, the participant presented with the set of candidate visualization layouts can select one of these candidates and an indication of this selection is provided to the application services platform 110 by the client device 105 of the participant.

The process 500 includes an operation 512 of providing the selected candidate layout, the transcript, and the additional information associated with the online communication session as an input to a language model 128, and an operation 514 of obtaining visualization information as an output from the language model 128. The visualization information is formatted according to the selected candidate layout and includes information based on the transcript, the additional information associated with the online communication session, or both. The visualization information can be used to populate a virtual whiteboard. The prompt construction unit 126 creates the prompt for the language model 128 based on the selected candidate layout, the transcript, and the additional information associated with the online communication session as discussed in the preceding examples.

The process 500 includes an operation 516 of causing the plurality of client devices associated with the participants of the online communication session to present the visualization information in an interactive workspace on a user interface of the plurality of client devices 105. The interactive workspace is a virtual whiteboard in some implementations, and the visualization information is used to populate the virtual whiteboard. The user interface provides controls that enable users of the plurality of client devices to make changes to the visualization information. As discussed in the preceding examples, the participants to the online communication session are able to collaborate with other meeting participants in creating and/or modifying visualizations of content associated with the meeting.

The process 500 includes an operation 518 of synchronizing the changes to the visualization information among the plurality of client devices during the online communication session. As discussed in the preceding examples, the trigger monitoring unit 206 of the application services platform 110 detects changes are made to the visualization information and the request processing unit 122 pushes these changes out to the client devices 105 of the participants via native application 114, the web application 190, or the communications platform web application 192.

Figure 6:
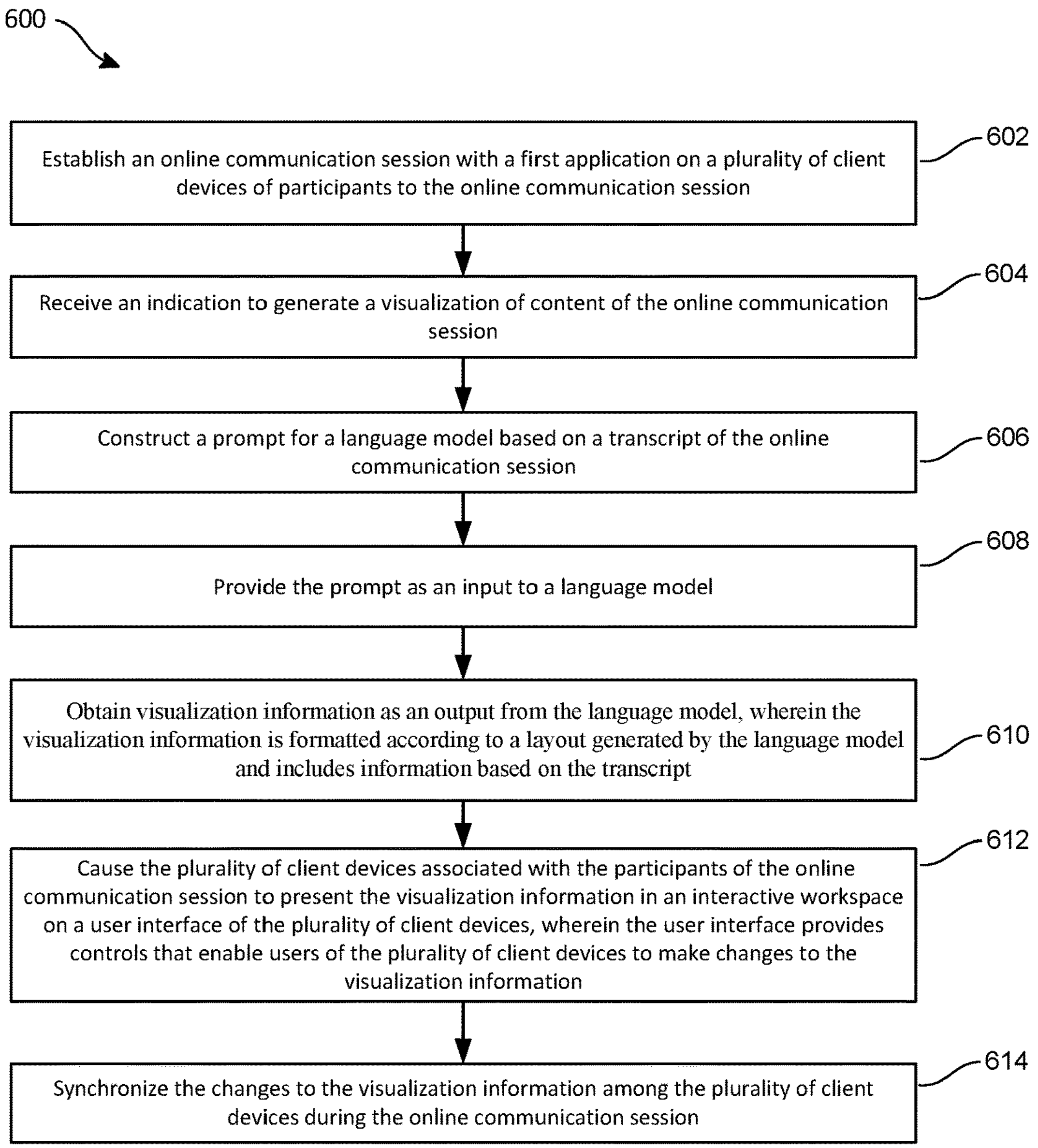
FIG. 6 is a flow chart of another example process for automatically generating visualizations of meeting content according to the techniques disclosed herein.

FIG. 6 is a flow chart of another example process 600 for automatically generating visualizations of meeting content according to the techniques disclosed herein. The process 600 can be implemented by the application services platform 110 as discussed in the preceding examples.

The process 600 includes an operation 602 of establishing an online communication session with a first application on a plurality of client devices of participants to the online communication session. The application services platform 110 facilitates establishing the online communication session with the plurality of client device 105 of the participants of the online communication session.

The process 600 includes an operation 604 of receiving an indication to generate a visualization of content of the online communication session. The occurrence of the trigger condition indicates that a visualization of content associated with the online communication session should be generated and presented on the client devices 105 associated with the participants of the online communication session. As discussed in the preceding examples, the trigger monitoring unit 206 monitors various aspects of the online communication session to determine whether a trigger condition is satisfied that indicates that a visualization should be created for the online communication session.

The process 600 includes an operation 606 of constructing a prompt for a language model 128 based on a transcript of the online communication session and an operation 608 of providing the prompt to the language model 128 as an input. The prompt construction unit 126 includes at least a portion of the transcript in the prompt in some implementations. The prompt may also include additional information, such as a meeting category for the online communication session, chat messages for the online communication session, and/or additional information. The categorization model 130 analyzes the transcript and additional information to determine a meeting category for the online communication session. Alternatively, in some implementations, the prompt includes an instruction of the constructing the prompt to include instructions to the language model to generate a set of candidate visualization layouts based on the transcript in which each of the candidate visualization layouts is formatted according to a different layout generated by the language model and include information based on the transcript.

The process 600 includes an operation 610 of obtaining visualization information as an output from the language model. The visualization information is formatted according to a layout generated by the language model and includes information based on the transcript.

The process 600 includes an operation 612 of causing the plurality of client devices associated with the participants of the online communication session to present the visualization information in an interactive workspace on a user interface of the plurality of client devices, wherein the user interface provides controls that enable users of the plurality of client devices to make changes to the visualization information. The interactive workspace is a virtual whiteboard in some implementations, and the visualization information is used to populate the virtual whiteboard. The user interface provides controls that enable users of the plurality of client devices to make changes to the visualization information. As discussed in the preceding examples, the participants to the online communication session are able to collaborate with other meeting participants in creating and/or modifying visualizations of content associated with the meeting.

The process 600 includes an operation 614 of synchronizing the changes to the visualization information among the plurality of client devices during the online communication session. As discussed in the preceding examples, the trigger monitoring unit 180 of the application services platform 110 detects changes are made the visualization information and the request processing unit 122 pushes these changes out to the client devices 105 of the participants via native application 114, the web application 190, or the communications platform web application 192.

Figure 7:
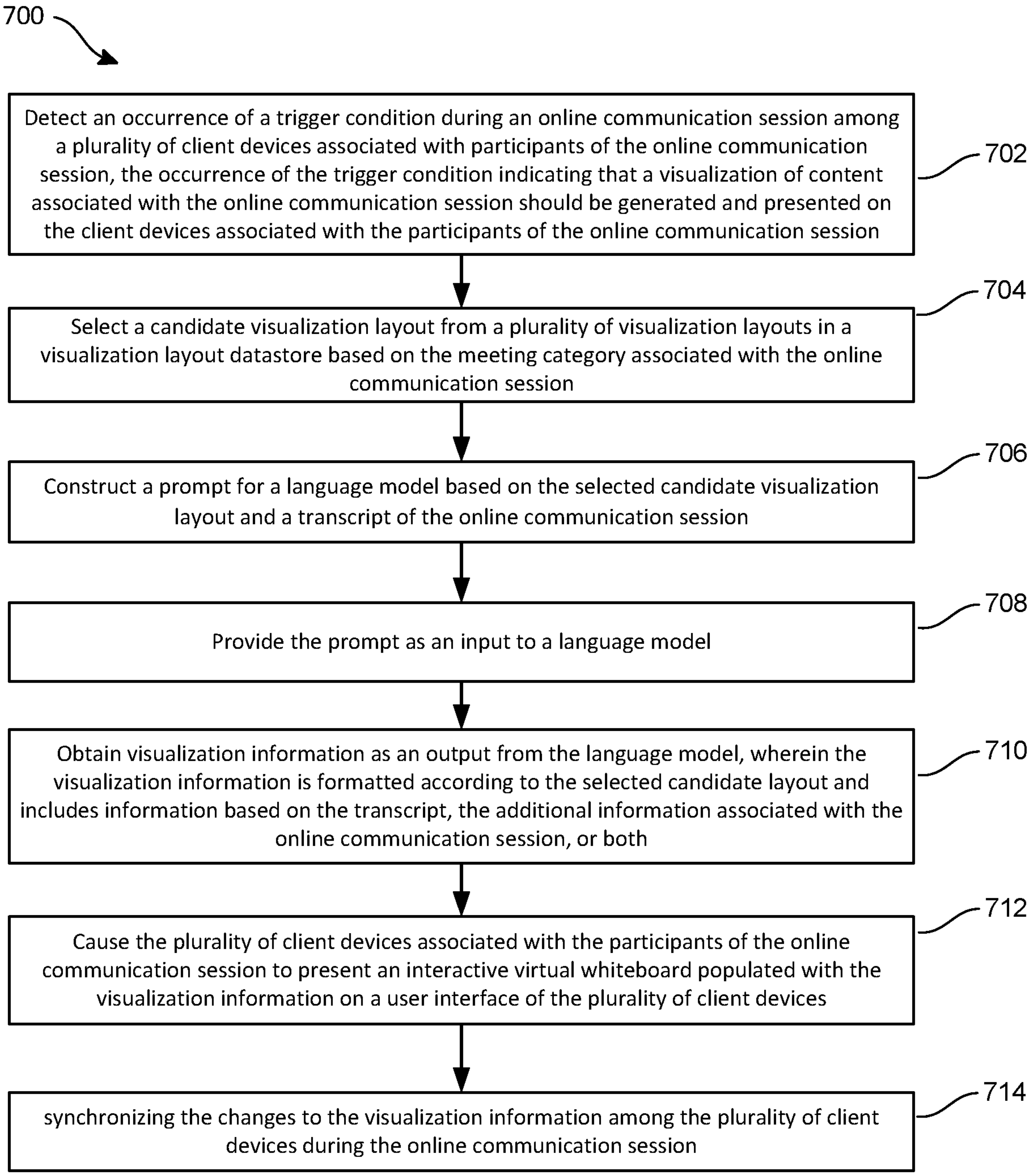
FIG. 7 is a flow chart of another example process for automatically generating visualizations of meeting content according to the techniques disclosed herein.

FIG. 7 is a flow chart of another example process 700 for automatically generating visualizations of meeting content according to the techniques disclosed herein. The process 700 can be implemented by the application services platform 110 as discussed in the preceding examples.

The process 700 includes an operation 702 of detecting an occurrence of a trigger condition during an online communication session among a plurality of client devices associated with participants of the online communication session. The occurrence of the trigger condition indicates that a visualization of content associated with the online communication session should be generated and presented on the client devices 105 associated with the participants of the online communication session. As discussed in the preceding examples, the trigger monitoring unit 206 monitors various aspects of the online communication session to determine whether a trigger condition is satisfied that indicates that a visualization should be created for the online communication session.

The process 700 includes an operation 704 selecting a candidate visualization layout from a plurality of visualization layouts in a visualization layout datastore based on the meeting category associated with the online communication session. The candidate layout selection unit 208 selects the candidate visualization layout from the visualization layout templates datastore 202.

The process 700 includes an operation 706 constructing a prompt for a language model based on the selected candidate visualization layout and a transcript of the online communication session and an operation 708 providing the prompt as an input to a language model 128. The prompt construction unit 128 constructs the prompt for the language model 128 as discussed in the preceding examples and provides the prompt to the language model 128.

The process 700 includes an operation 710 obtaining visualization information as an output from the language model and an operation 712 causing the plurality of client devices associated with the participants of the online communication session to present the visualization information in an interactive workspace on a user interface of the plurality of client devices. The interactive workspace is a virtual whiteboard in some implementations, and the visualization information is used to populate the virtual whiteboard. The visualization information is formatted according to the selected candidate layout and includes information based on the transcript, and the additional information associated with the online communication session, or both. The visualization information is formatted according to the selected candidate layout and includes information based on the transcript, the additional information associated with the online communication session, or both.

The process 700 includes an operation 714 synchronizing the changes to the visualization information among the plurality of client devices during the online communication session. As discussed in the preceding examples, the trigger monitoring unit 206 of the application services platform 110 detects changes are made to the visualization information and the request processing unit 122 pushes these changes out to the client devices 105 of the participants via native application 114, the web application 190, or the communications platform web application 192.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
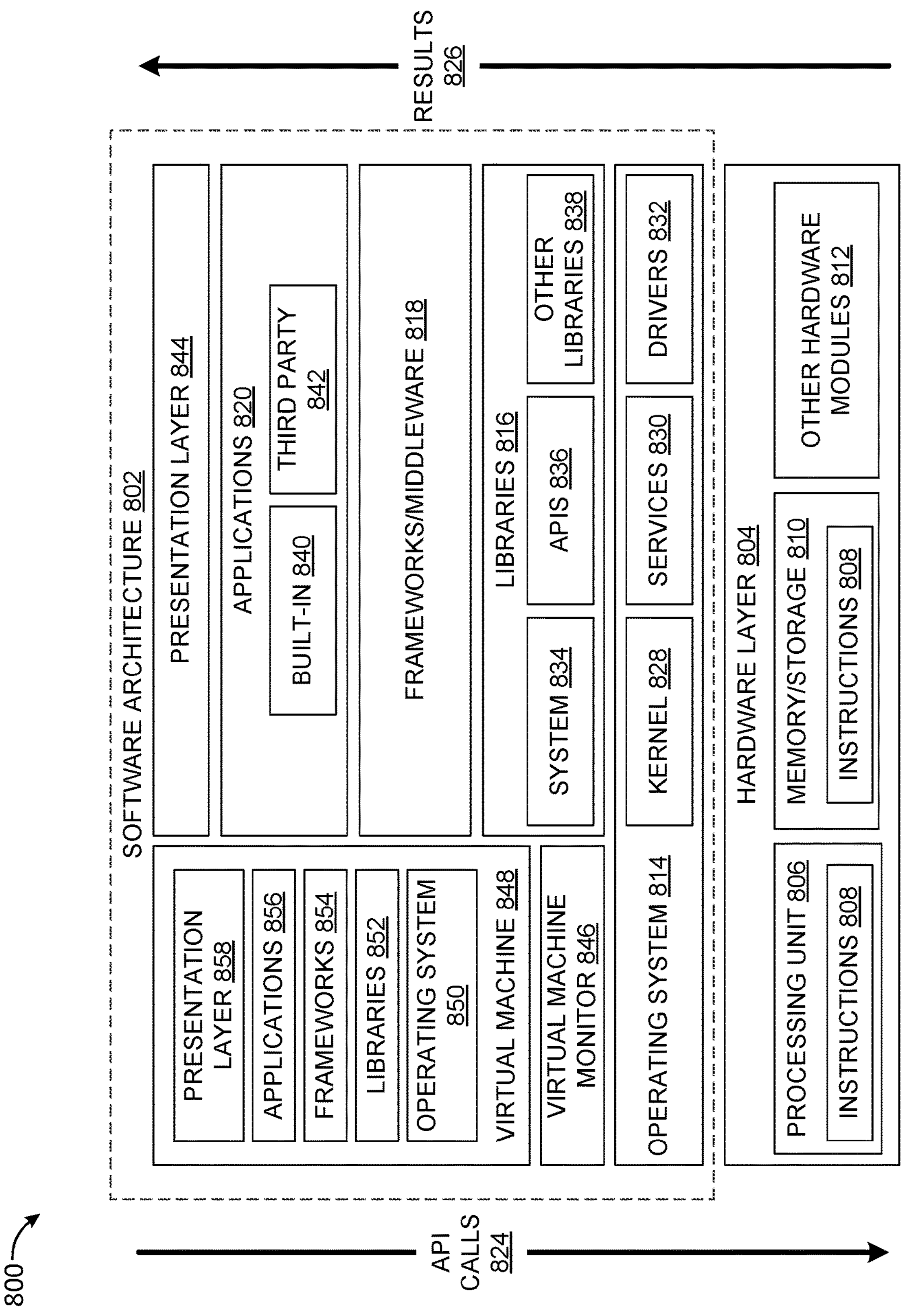
FIG. 8 is a block diagram showing an example software architecture, various portions of which may be used in conjunction with various hardware architectures herein described, which may implement any of the described features.

FIG. 8 is a block diagram 800 illustrating an example software architecture 802, various portions of which may be used in conjunction with various hardware architectures herein described, which may implement any of the above-described features. FIG. 8 is a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than interacting directly with the OS 814. The libraries 816 may include system libraries 834 (for example, C standard library) that may provide functions such as memory allocation, string manipulation, file operations. In addition, the libraries 816 may include API libraries

836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
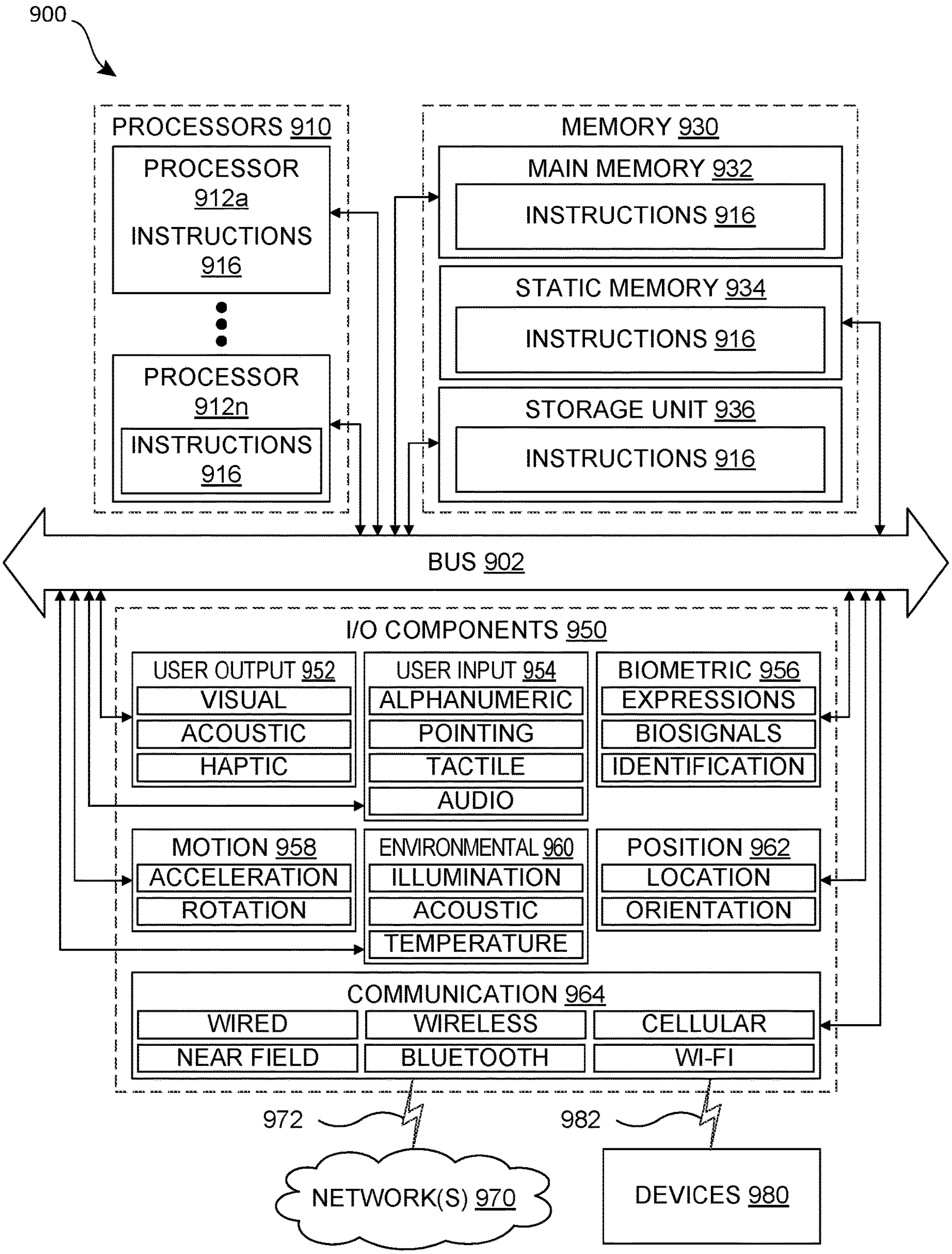
FIG. 9 is a block diagram showing components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912*a* to 912*n* that may execute the instructions 916 and process data. In some examples, one or more processors 910 may execute instructions provided or identified by one or more other processors 910. The term "processor" includes a multicore processor including cores that may execute instructions contemporaneously. Although FIG. 9 shows multiple processors, the machine 900 may include a single processor with a single core, a single processor with multiple cores (for example, a multicore processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 964, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

detecting an occurrence of a trigger condition during an online communication session among a plurality of client devices associated with participants of the online communication session, the occurrence of the trigger condition indicating that a visualization of content associated with the online communication session should be generated and presented on the plurality of client devices associated with the participants of the online communication session;

selecting a candidate visualization layout from a plurality of visualization layouts in a visualization layout datastore based on a meeting category associated with the online communication session;

constructing a first prompt for a language model based on the candidate visualization layout and a transcript of the online communication session;

providing the first prompt as an input to the language model;

obtaining visualization information as an output from the language model, wherein the visualization information is formatted according to the candidate visualization layout and includes information based on the transcript;

causing the plurality of client devices associated with the participants of the online communication session to present an interactive virtual whiteboard populated with the visualization information on a user interface of the plurality of client devices; and synchronizing changes to the visualization information among the plurality of client devices during the online communication session, wherein synchronizing the changes to the visualization information includes:

determining that a synchronization trigger condition has been satisfied based on changes to one or more of the transcript of the online communication session, chat messages among the participants to the online communication session, or both during the online communication session;

analyzing the transcript of the online communication session, chat messages among the participants to the online communication session, or both to identify ideas that have been introduced by one or more participants to the online communication session but have not yet been integrated into the visualization information presented in the interactive virtual whiteboard by the language model or manually integrated into the visualization information by the one or more participants;

constructing a second prompt to instruct the language model to update the visualization information based on the ideas that have been introduced by the one or more participants;

providing the second prompt, the visualization information, and the ideas as an input to the language model to cause the language model to output updated visualization information; and causing the interactive virtual whiteboard to present the updated visualization information on the user interface of the plurality of client devices associated with the participants of the online communication session.

2. The data processing system of claim 1, wherein the memory further includes instructions configured to cause the processor alone or in combination with other processors to perform operations of:

analyzing information associated with the online communication session to determine the meeting category associated with the online communication session, wherein analyzing the information associated with the online communication session includes generating the transcript of an audio portion of the online communication session using a transcription model, and analyzing the transcript and additional information associated with the online communication session as an input to a categorization model that outputs the meeting category associated with the online communication session.

3. The data processing system of claim 1, wherein selecting a candidate visualization layout further comprises:

selecting a set of candidate visualization layouts from a plurality of visualization layouts in a visualization layout datastore based on the meeting category associated with the online communication session;

causing a client device of a participant to the online communication session to present the set of candidate visualization layouts on the user interface of the client device; and receiving an indication from the client device indicating a selected candidate layout from among the set of candidate visualization layouts.

4. The data processing system of claim 1, wherein the user interface provides controls that enable users of the plurality of client devices to make changes to the visualization information.

5. The data processing system of claim 1, wherein detecting the occurrence of the trigger condition further comprises:

detecting an indication received from a control of the user interface of a communications application on a client device of a participant of the online communication session indicating that the participant has requested that the visualization be created for the online communication session.

6. The data processing system of claim 1, wherein detecting the occurrence of the trigger condition further comprises:

analyzing natural language prompts using the language model to detect a use of one or more trigger words, phrases, or questions that indicate that the visualization should be created for the online communication session, the natural language prompts being submitted through a user interface of a communication application on a client device of a participant of the online communication session; and receiving an output from the language model indicating the occurrence of the trigger condition responsive to detecting the use of the one or more trigger words, phrases, or questions in the natural language prompts.

7. The data processing system of claim 1, wherein detecting the occurrence of the trigger condition further comprises:

obtaining the transcript and additional information associated with the online communication session;

analyzing the transcript and additional information associated with the online communication session using the language model to obtain a prediction whether the transcript and the additional information indicate that a visualization recommendation should be made to a participant of the online communication session; and detecting the occurrence of the trigger condition responsive to the language model outputting the prediction that the visualization recommendation should be made.

8. The data processing system of claim 7, wherein the additional information associated with the online communication session includes messages from a meeting chat associated with the online communication session, whether screen sharing of content is currently occurring, attendee information for the participants to the online communication session, or a combination thereof.

9. The data processing system of claim 1, wherein selecting the candidate visualization layout from the plurality of visualization layouts further comprises:

ranking candidate visualization layouts selected for the meeting category based on a frequency with which the candidate visualization layouts are selected for the meeting category; and selecting a highest ranking candidate visualization layout as the candidate visualization layout.

10. The data processing system of claim 1, wherein the memory further includes instructions configured to cause the processor alone or in combination with other processors to perform operations of:

causing a client device of a participant to display a candidate visualization layout pane that displays a set of candidate visualization layouts, the candidate visualization layout pane including a preview of each visualization layout of the set of candidate visualization layouts.

11. The data processing system of claim 1, wherein the memory further includes instructions configured to cause the processor alone or in combination with other processors to perform operations of:

detecting the occurrence of a second trigger condition during the online communication session, the occurrence of the trigger condition indicating that a change in topic has occurred by analyzing the transcript and messages from a meeting chat associated with the online communication session using the language model;

responsive to detecting the occurrence of the second trigger condition, selecting a set of second candidate visualization layouts from the plurality of visualization layouts in the visualization layout datastore based on the meeting category associated with the online communication session and a current topic; and causing a client device of a participant to the online communication session to present the set of second candidate visualization layouts on the user interface of the client device.

12. The data processing system of claim 1, wherein the memory further includes instructions configured to cause the processor alone or in combination with other processors to perform operations of:

detecting that a topic of conversation of the online communication session has changed from a previous topic of conversation to a current topic of conversation;

automatically saving the visualization information for a previous topic of conversation to a persistent datastore accessible to the participants of the online communication session after the online communication session has ended; and instantiating new visualization information for the current topic of conversation.

13. The data processing system of claim 1, wherein the language model comprises a Large Language Model (LLM).

14. A method implemented in a data processing system for automatically generating visualizations for online communication sessions, the method comprising:

detecting an occurrence of a trigger condition during an online communication session among a plurality of client devices associated with participants of the online communication session, the occurrence of the trigger condition indicating that a visualization of content associated with the online communication session should be generated and presented on the plurality of client devices associated with the participants of the online communication session;

analyzing information associated with the online communication session to determine a meeting category associated with the online communication session, wherein analyzing the information associated with the online communication session includes generating a transcript of an audio portion of the online communication session using a transcription model, and analyzing the transcript and additional information associated with the online communication session as an input to a categorization model that outputs the meeting category associated with the online communication session;

selecting a set of candidate visualization layouts from a plurality of visualization layouts in a visualization layout datastore based on the meeting category associated with the online communication session;

causing a client device of a participant to the online communication session to present the set of candidate visualization layouts on a user interface of the client device;

receiving an indication from the client device indicating a selected candidate layout from among the set of candidate visualization layouts;

providing the selected candidate layout, the transcript, and the additional information associated with the online communication session as an input to a language model;

obtaining visualization information as an output from the language model, wherein the visualization information is formatted according to the selected candidate layout and includes information based on the transcript, the additional information associated with the online communication session, or both;

causing the plurality of client devices associated with the participants of the online communication session to present the visualization information in an interactive virtual workspace on a user interface of the plurality of client devices, wherein the user interface provides controls that enable users of the plurality of client devices to make changes to the visualization information; and synchronizing changes to the visualization information among the plurality of client devices during the online communication session, wherein synchronizing the changes to the visualization information includes:

determining that a synchronization trigger condition has been satisfied based on changes to one or more of the transcript of the online communication session, chat messages among the participants to the online communication session, or both during the online communication session;

analyzing the transcript of the online communication session, chat messages among participants to the online communication session, or both to identify ideas that have been introduced by one or more participants to the online communication session but have not yet been integrated into the visualization information presented in the interactive virtual workspace by the language model or manually integrated into the visualization information by the one or more participants;

constructing a second prompt to instruct the language model to update the visualization information based on the ideas that have been introduced by the one or more participants;

providing the second prompt, the visualization information, and the ideas as an input to the language model to cause the language model to output updated visualization information; and causing the interactive virtual workspace to present the updated visualization information on the user interface of the plurality of client devices associated with the participants of the online communication session.

15. The method of claim 14, wherein detecting the occurrence of the trigger condition further comprises:

detecting an indication received from a control of the user interface of a communications application on the client device of a participant of the online communication session indicating that the participant has requested that the visualization be created for the online communication session.

16. The method of claim 14, wherein detecting the occurrence of the trigger condition further comprises:

analyzing natural language prompts using the language model to detect a use of one or more trigger words, phrases, or questions that indicate that the visualization should be created for the online communication session, the natural language prompts being submitted through a user interface of a communication application on the client device of a participant of the online communication session; and receiving an output from the language model indicating the occurrence of the trigger condition responsive to detecting the use of the one or more trigger words, phrases, or questions in the natural language prompts.

17. The method of claim 14, wherein detecting the occurrence of the trigger condition further comprises:

obtaining the transcript and the additional information associated with the online communication session;

analyzing the transcript and additional information associated with the online communication session using the language model to obtain a prediction whether the transcript and the additional information indicate that a visualization recommendation should be made to a participant of the online communication session; and detecting the occurrence of the trigger condition responsive to the language model outputting the prediction that the visualization recommendation should be made.

18. A data processing system comprising:

a processor; and a memory storing executable instructions that, when executed, cause the processor alone or in combination with other processors to perform operations of:

establishing an online communication session with a first application on a plurality of client devices of participants to the online communication session;

receiving an indication to generate a visualization of content of the online communication session;

constructing a first prompt for a language model based on a transcript of the online communication session and a meeting category associated with the online communication session;

providing the first prompt as an input to the language model;

obtaining visualization information as an output from the language model, wherein the visualization information is formatted according to a layout generated by the language model and includes information based on the transcript and the meeting category;

causing the plurality of client devices associated with the participants of the online communication session to present the visualization information in an interactive virtual workspace on a user interface of the plurality of client devices, wherein the user interface provides controls that enable users of the plurality of client devices to make changes to the visualization information; and synchronizing the changes to the visualization information among the plurality of client devices during the online communication session, wherein synchronizing the changes to the visualization information includes:

determining that a synchronization trigger condition has been satisfied based on changes to one or more of the transcript of the online communication session, chat messages among participants to the online communication session, or both during the online communication session;

analyzing the transcript of the online communication session, chat messages among the participants to the online communication session, or both to identify ideas that have been introduced by one or more participants to the online communication session but have not yet been integrated into the visualization information presented in the interactive virtual workspace by the language model or manually integrated into the visualization information by the one or more participants;

constructing a second prompt to instruct the language model to update the visualization information based on the ideas that have been introduced by the one or more participants;

providing the second prompt, the visualization information, and the ideas as an input to the language model to cause the language model to output updated visualization information; and causing the interactive virtual workspace to present the updated visualization information on the user interface of the plurality of client devices associated with the participants of the online communication session.

19. The data processing system of claim 18, wherein the memory further includes instructions configured to cause the processor alone or in combination with other processors to perform operations of:

analyzing the transcript of the online communication session to determine a meeting category associated with the online communication session;

wherein constructing the first prompt further comprises constructing the first prompt for the language model based on the transcript of the online communication session and the meeting category.

20. The data processing system of claim 18, wherein constructing the first prompt for a language model based on the transcript of the online communication session further comprises:

constructing the first prompt to include instructions to the language model to generate a set of candidate visualization layouts based on the transcript in which each candidate visualization layout of the set of candidate visualization layouts is formatted according to a different layout generated by the language model and include information based on the transcript; and wherein obtaining the visualization information further comprises receiving the set of candidate visualization layouts;

wherein receiving the indication to generate the visualization of content of the online communication session further comprises:

causing a client device of a participant to the online communication session to present the set of candidate visualization layouts on a user interface of the client device;

receiving an indication from the client device indicating a selected candidate layout from among the set of candidate visualization layouts; and causing the plurality of client devices associated with the participants of the online communication session to present the visualization information further comprises causing the plurality of client devices to present the selected candidate layout.

* * * * *